(12) United States Patent
Sasaki

(10) Patent No.: US 6,854,175 B2
(45) Date of Patent: Feb. 15, 2005

(54) METHOD OF MANUFACTURING A THIN FILM MAGNETIC HEAD

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 496 days.

(21) Appl. No.: 09/974,815

(22) Filed: Oct. 12, 2001

(65) Prior Publication Data

US 2002/0053130 A1 May 9, 2002

(30) Foreign Application Priority Data

Oct. 13, 2000 (JP) .......................................... 2000-313416

(51) Int. Cl.[7] .......................... G11B 5/127; G11B 5/23; C23F 1/12
(52) U.S. Cl. ............................... 29/603.15; 29/603.12; 29/603.13; 29/603.18; 216/22; 216/64; 216/67; 204/192.34; 204/192.35; 360/119; 360/125
(58) Field of Search .......................... 29/603.12, 603.16, 29/603.13, 603.14, 603.18; 216/67, 22, 64; 204/192.2, 192.34, 192.35; 360/122, 119, 125

(56) References Cited

U.S. PATENT DOCUMENTS

| | | | | |
|---|---|---|---|---|
| 4,208,241 A | * | 6/1980 | Harshbarger et al. | ..... 216/67 X |
| 4,267,013 A | * | 5/1981 | Iida et al. | ................. 216/67 X |
| 6,047,462 A | * | 4/2000 | Miyauchi et al. | ........ 29/603.14 |
| 6,591,480 B1 | * | 7/2003 | Chen et al. | .......... 29/603.16 X |

FOREIGN PATENT DOCUMENTS

JP 62-285406 * 12/1987 .............. 204/192.2

* cited by examiner

Primary Examiner—A. Dexter Tugbang
(74) Attorney, Agent, or Firm—Oliff & Berridge, PLC

(57) ABSTRACT

A method of manufacturing a thin film magnetic head capable of improving a yield while making a pole width extremely minute with high precision is provided. A write gap layer and a bottom pole are selectively etched in a region other than a portion corresponding to a front end part through the RIE with the front end part having an extremely minute uniform width as a mask in an atmosphere of gas including at least chlorine out of chlorine and boron trichloride and at an ambient temperature within a range of 30° C. to 300° C. The width (pole width) of a pole portion can be made uniform with high precision along a length direction so that the yield of the thin film magnetic head can be improved.

5 Claims, 23 Drawing Sheets

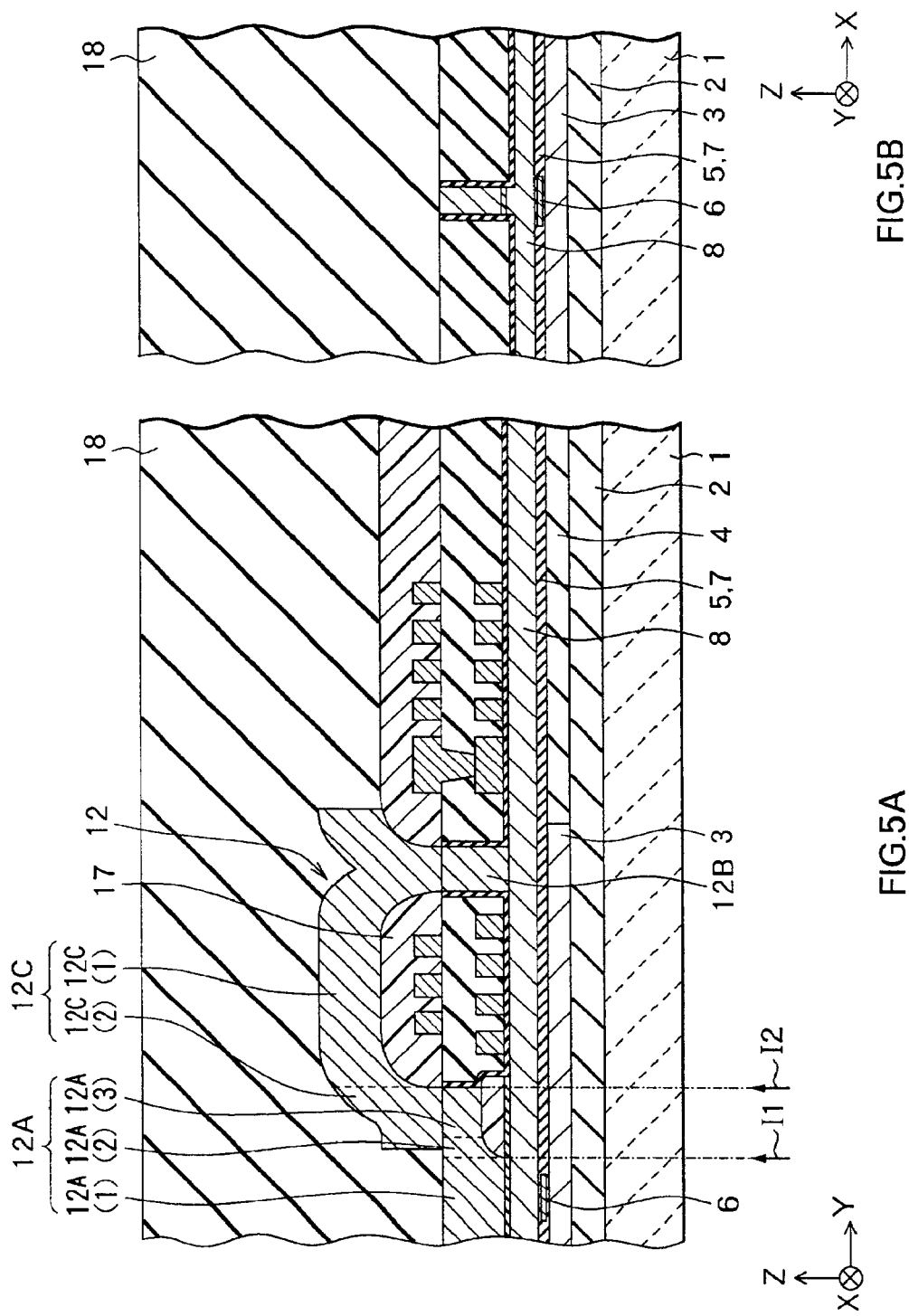

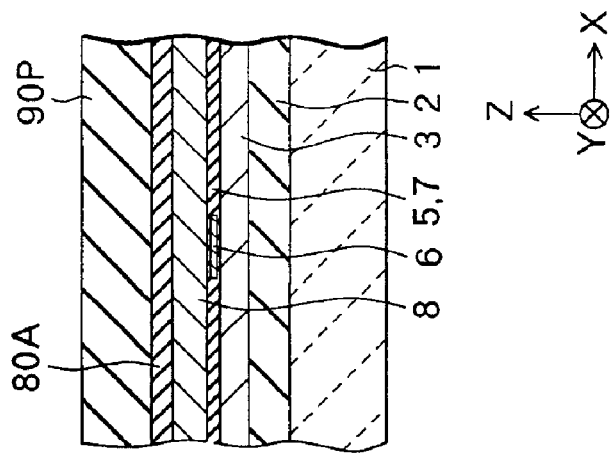
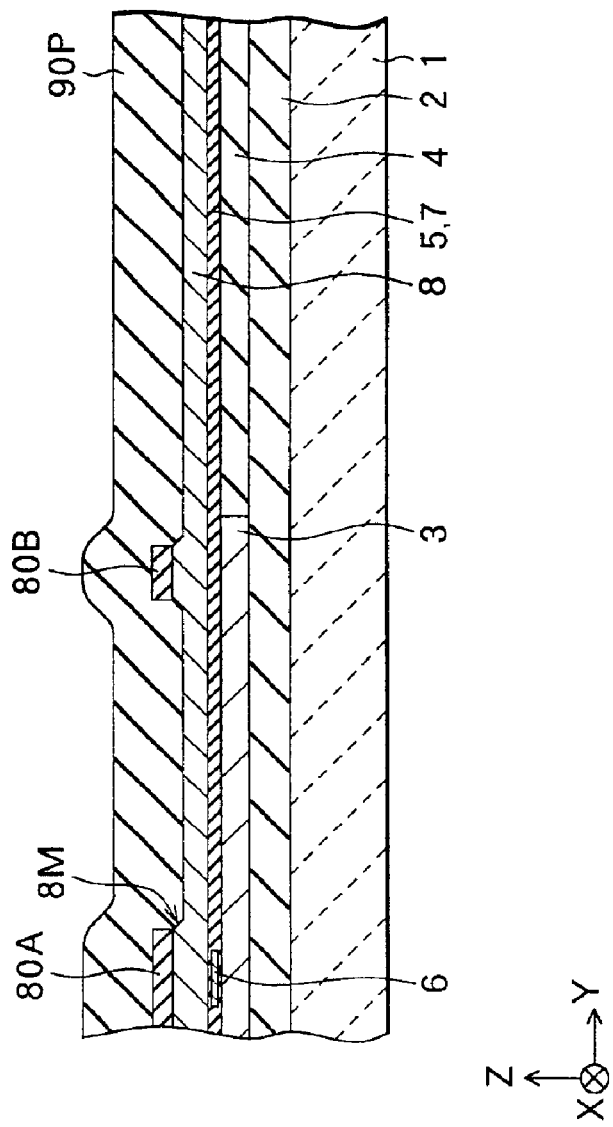
FIG.16B
FIG.16A

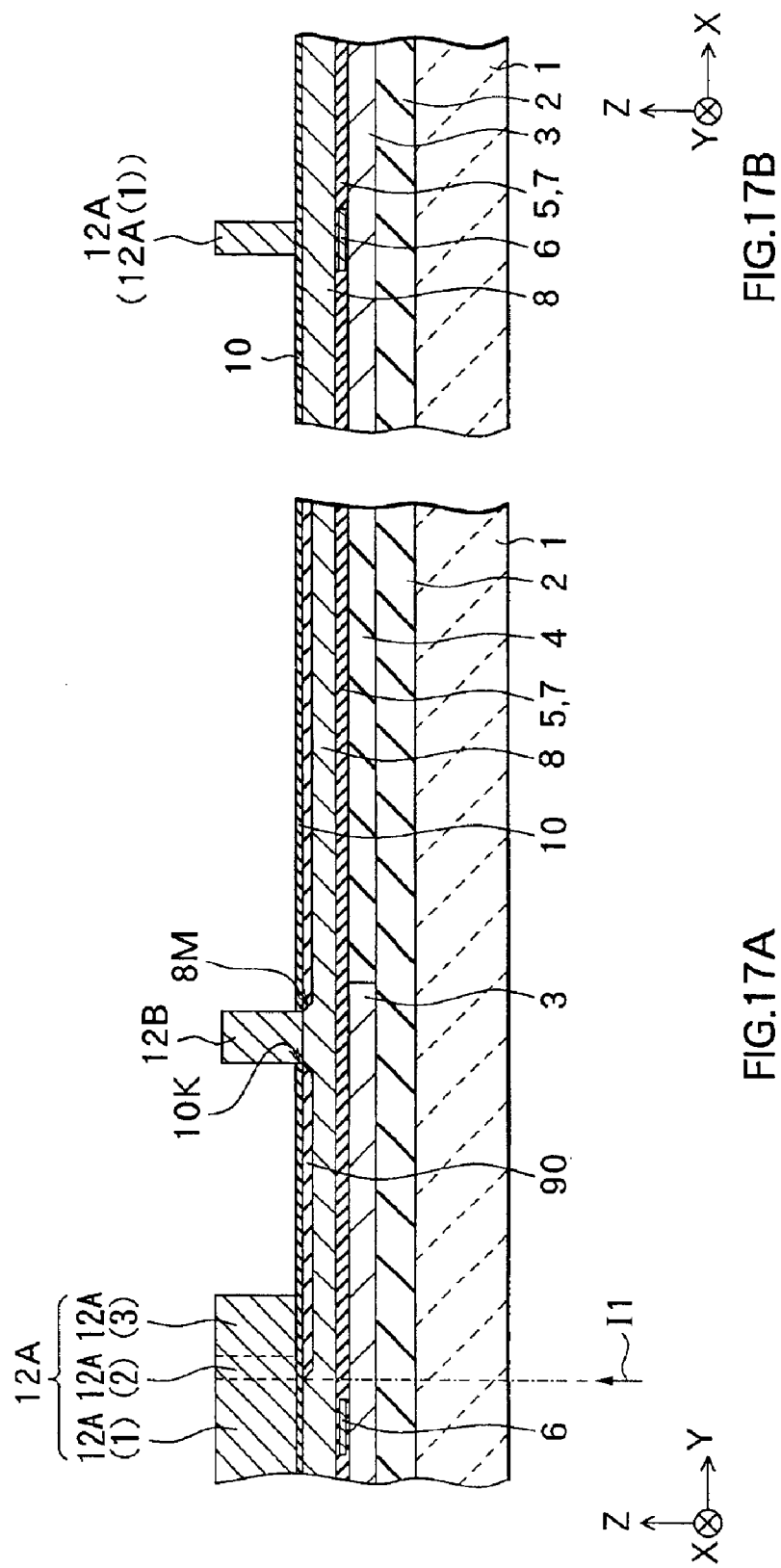

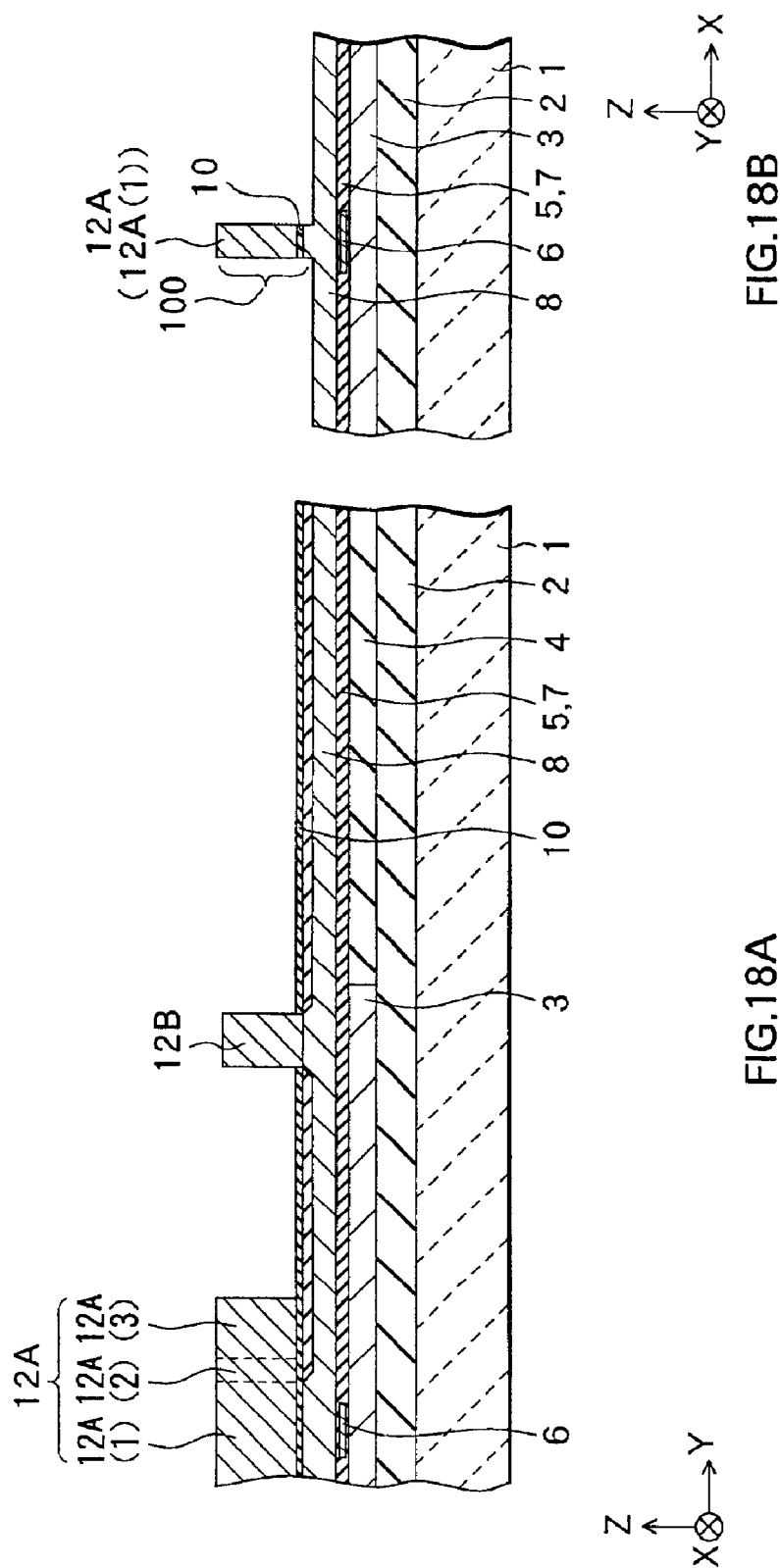

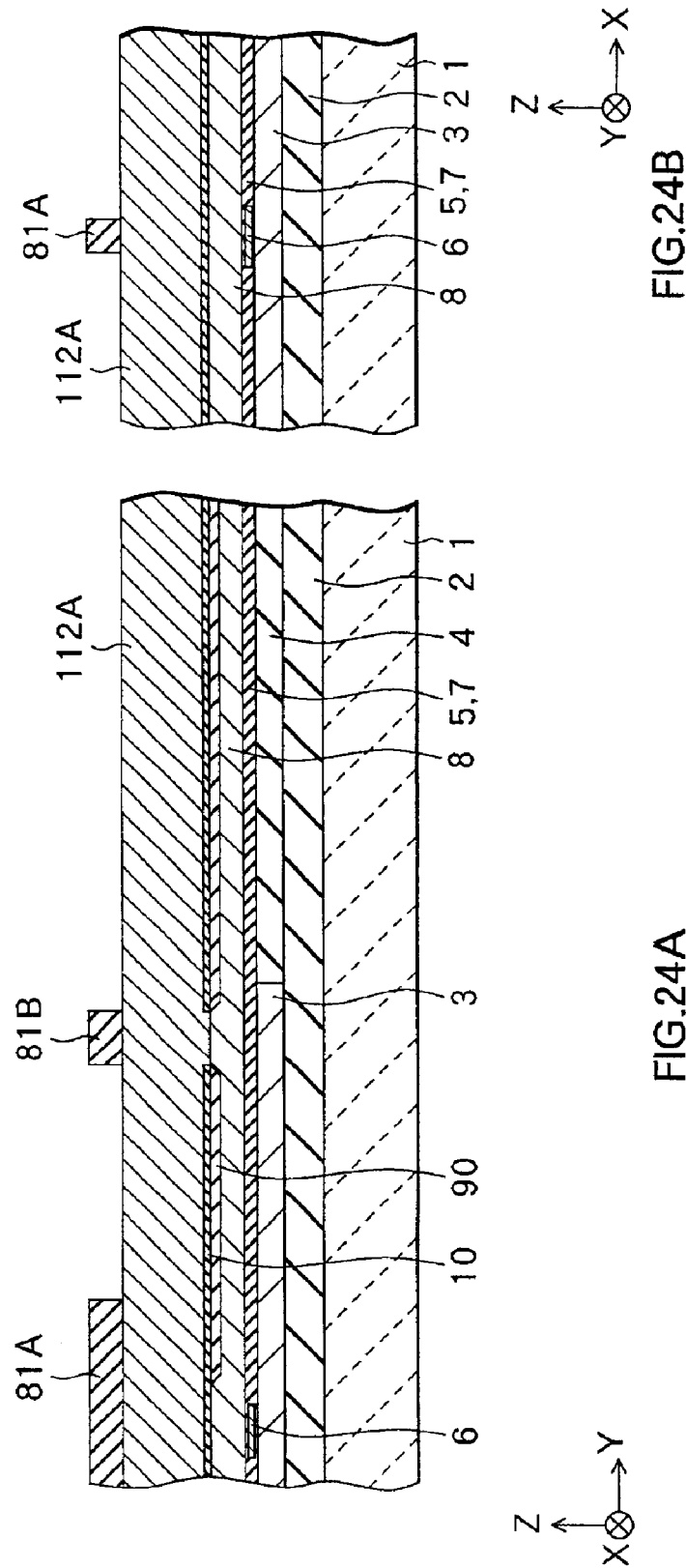

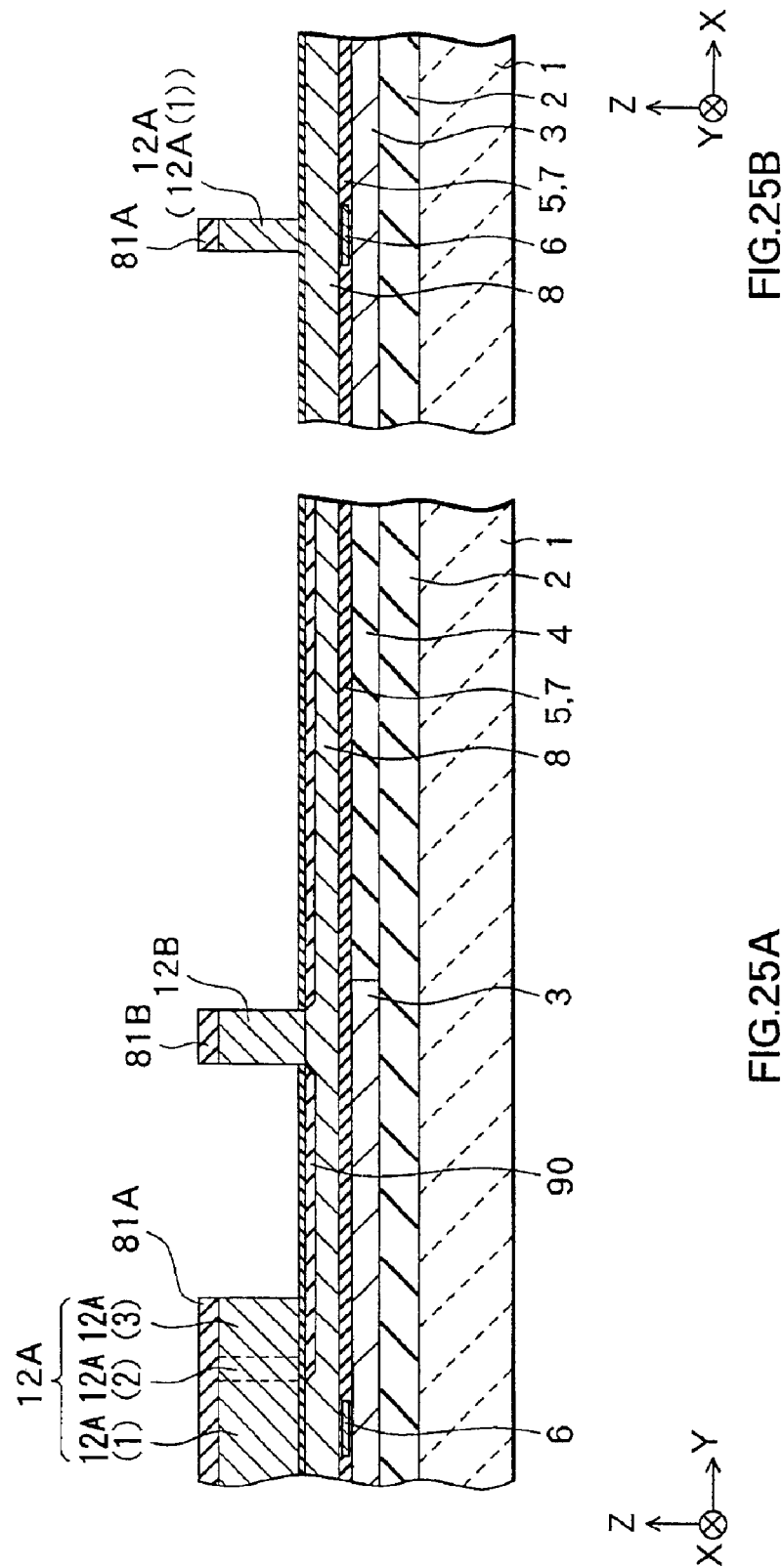

METHOD OF MANUFACTURING A THIN FILM MAGNETIC HEAD

BACKGROUND OF THE INVENTION

1. Field of the Invention

The present invention relates to a method of manufacturing a thin film magnetic head having at least an inductive magnetic transducer for writing.

2. Description of the Related Art

In recent years, an improvement in performance of a thin film magnetic head is demanded in accordance with an increase in surface recording density of a hard disk drive. As a thin film magnetic head, a composite thin film magnetic head in which a recording head having an inductive magnetic transducer for writing and a reproducing head having a magnetoresistive (hereinbelow, referred to as MR) element for reading are laminated is widely used.

The recording head is, for example, constructed so as to include a top pole and a bottom pole sandwiching a write gap, and a coil for generating a magnetic flux disposed between the top pole and the bottom pole with an insulating layer in-between. The top pole and the bottom pole have uniform widths which are the same as each other in the vicinity of the write gap in a region on a side close to a recording-medium-facing surface (air bearing surface) facing a magnetic recording medium (hereinbelow, simply referred to as "recording medium"). These parts constitute a "pole portion" for defining a recording track width.

In order to increase the recording density in performance of the recording head, it is necessary to make a width (pole width) of the pole portion extremely minute to the order of submicrons so as to increase the track density on the recording medium. In such a case, it is preferable to set the pole width uniform with high precision throughout the entire region of the pole portion. This is because a side-erasing phenomenon occurs when the pole width is partially wide. In the side-erasing phenomenon, a write operation is performed not only on a track region targeted for writing but also on its neighboring track region, so that information written upon the neighboring track region is overwritten and erased.

However, there is a problem that yield (rate of conforming item) is not sufficient at the time of manufacturing the thin film magnetic head because it is conventionally difficult to make the pole width uniform with high precision for the following reason. More specifically, at the time of forming the pole portion, for example, after the top pole is formed on the laminate of the bottom pole and the write gap so as to include a portion (uniform width portion) having an extremely minute uniform width corresponding to the recording track width, a region other than the portion corresponding to the uniform width portion in each of the bottom pole and the write gap is selectively etched and removed with the uniform width portion as a mask. Because ion milling is conventionally used as an etching method on the bottom pole and the write gap, an etching process is not performed uniformly when a difference is made in an irradiation amount of ion beam on the etching region owing to the structure of the top pole and the like, so that the width of the pole portion is increased in a region where the irradiation amount of ion beam is reduced. Such a problem is not resolved even though the etching process is performed while adjusting an irradiation angle of ion beam and/or rotating a substrate on which the pole portion and the like are formed.

SUMMARY OF THE INVENTION

The invention has been achieved in consideration of the problem. An object of the invention is to provide a method of manufacturing a thin film magnetic head capable of improving the yield while making the pole width extremely minute with high precision.

According to the invention, there is provided a method of manufacturing a thin film magnetic head comprising: a first magnetic layer and a second magnetic layer magnetically coupled to each other and having two magnetic poles facing each other with a gap layer in between near and in a recording-medium-facing surface to be faced with a recording medium; a thin film coil provided between the first and second magnetic layers; and an insulating layer for insulating the thin film coil from the first and the second magnetic layers. The second magnetic layer includes a uniform width portion which defines a recording track width of the recording medium. The method comprises: a first step of forming the first magnetic layer on a substrate through sputtering by using a magnetic material including iron nitride; a second step of forming the gap layer on the first magnetic layer; a third step of selectively forming at least the uniform width portion in the second magnetic layer on the gap layer by using a predetermined magnetic material, the uniform width portion extending so as to cross over a position in which the recording-medium-facing surface is to be formed; and a fourth step of selectively removing the gap layer in a region other than a portion corresponding to the uniform width portion and selectively removing the first magnetic layer in a region other than a portion corresponding to the uniform width portion to a predetermined depth, through reactive ion etching with the uniform width portion as a mask, in an atmosphere of gas including at least chlorine out of a group of chlorine and boron trichloride, and at an ambient temperature within a range of 30° C. to 300° C.

In the method of manufacturing the thin film magnetic head of the invention, to begin with, in the first step, the first magnetic layer is formed on the predetermined substrate through sputtering by using the magnetic material including iron nitride. Subsequently, in the second step, the gap layer is formed on the first magnetic layer. Subsequently, in the third step, at least the uniform width portion in the second magnetic layer is selectively formed on the gap layer by using the predetermined magnetic material so as to extend in the direction so as to be apart from the recording-medium-facing surface from the vicinity of the position in which the recording-medium-facing surface is to be formed. Subsequently, in the fourth step, the gap layer in the region other than the portion corresponding to the uniform width portion is selectively removed, and the first magnetic layer in the region other than the portion corresponding to the uniform width portion is selectively removed to the predetermined depth through reactive ion etching with the uniform width portion as a mask in the atmosphere of gas including at least chlorine out of chlorine and boron trichloride and at the ambient temperature within the range of 3° C. to 300° C. By performing the reactive ion etching under the above-described conditions, each part of the gap layer and the first magnetic layer is formed so as to have the same width as the width of the uniform width portion.

In the method of manufacturing the thin film magnetic head of the invention, in the third step, the uniform width portion may be formed through a plating process by using a magnetic material including iron, nickel and cobalt, or the uniform width portion may be formed through sputtering and an etching process by using a magnetic material including either a cobalt iron alloy or a cobalt iron alloy oxide as an amorphous alloy.

Furthermore, in the method of manufacturing the thin film magnetic head of the invention, it is preferable that the fourth step is performed at an ambient temperature within a range of 150° C. to 250° C.

Furthermore, in the method of manufacturing the thin film magnetic head of the invention, in the fourth step, the selective removal of the gap layer may be performed in an atmosphere of gas including chlorine and boron trichloride and the selective removal of the first magnetic layer may be performed in an atmosphere of gas including chlorine. In such a case, it is suitable that the selective removal of the gap layer is performed by setting an amount of the chlorine gas to be supplied within a range of 20 to 40 milliliters per minute and setting an amount of the boron trichloride gas to be supplied within a range of 60 to 80 milliliters per minute and the selective removal of the first magnetic layer is performed by setting an amount of the chlorine gas to be supplied within a range of 100 to 200 milliliters per minute.

Other and further objects, features and advantages of the invention will appear more fully from the following description.

BRIEF DESCRIPTION OF THE DRAWINGS

FIGS. 5A and 5B are cross sections for explaining a process subsequent to FIGS. 4A and 4B, respectively.

FIGS. 16A and 16B are cross sections for explaining a process subsequent to FIGS. 15A and 15B, respectively.

FIGS. 17A and 17B are cross sections for explaining a process subsequent to FIGS. 16A and 16B, respectively.

FIGS. 18A and 18B are cross sections for explaining a process subsequent to FIGS. 17A and 17B, respectively.

FIGS. 24A and 24B are cross sections showing a process in a modification with regard to the method of manufacturing the thin film magnetic head according to the second embodiment of the invention.

FIGS. 25A and 25B are cross sections for explaining a process subsequent to FIGS. 24A and 24B, respectively.

DETAILED DESCRIPTION OF THE PREFERRED EMBODIMENTS

Figures 1A, 1B:
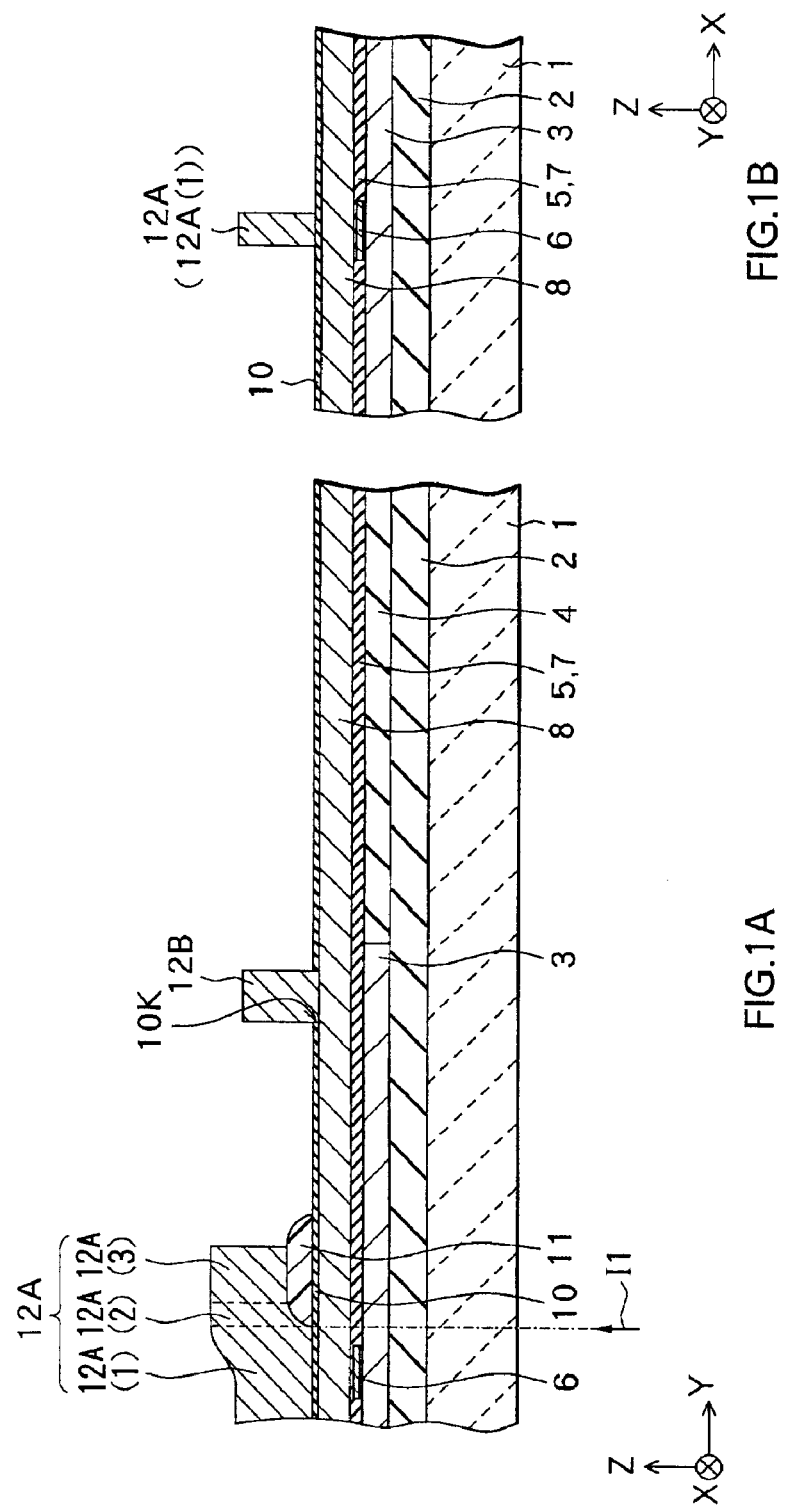
FIGS. 1A and 1B are cross sections for explaining a process in a method of manufacturing a thin film magnetic head according to a first embodiment of the invention.

Embodiments of the invention will be described in detail hereinbelow by referring to the drawings.

First Embodiment

First of all, referring to FIGS. 1A and 1B to FIGS. 6A and 6B, and FIGS. 7 to 9, an example of a method of manufacturing a composite thin film magnetic head as a method of manufacturing a thin film magnetic head according to a first embodiment of the invention will be described.

Figures 6A, 6B:
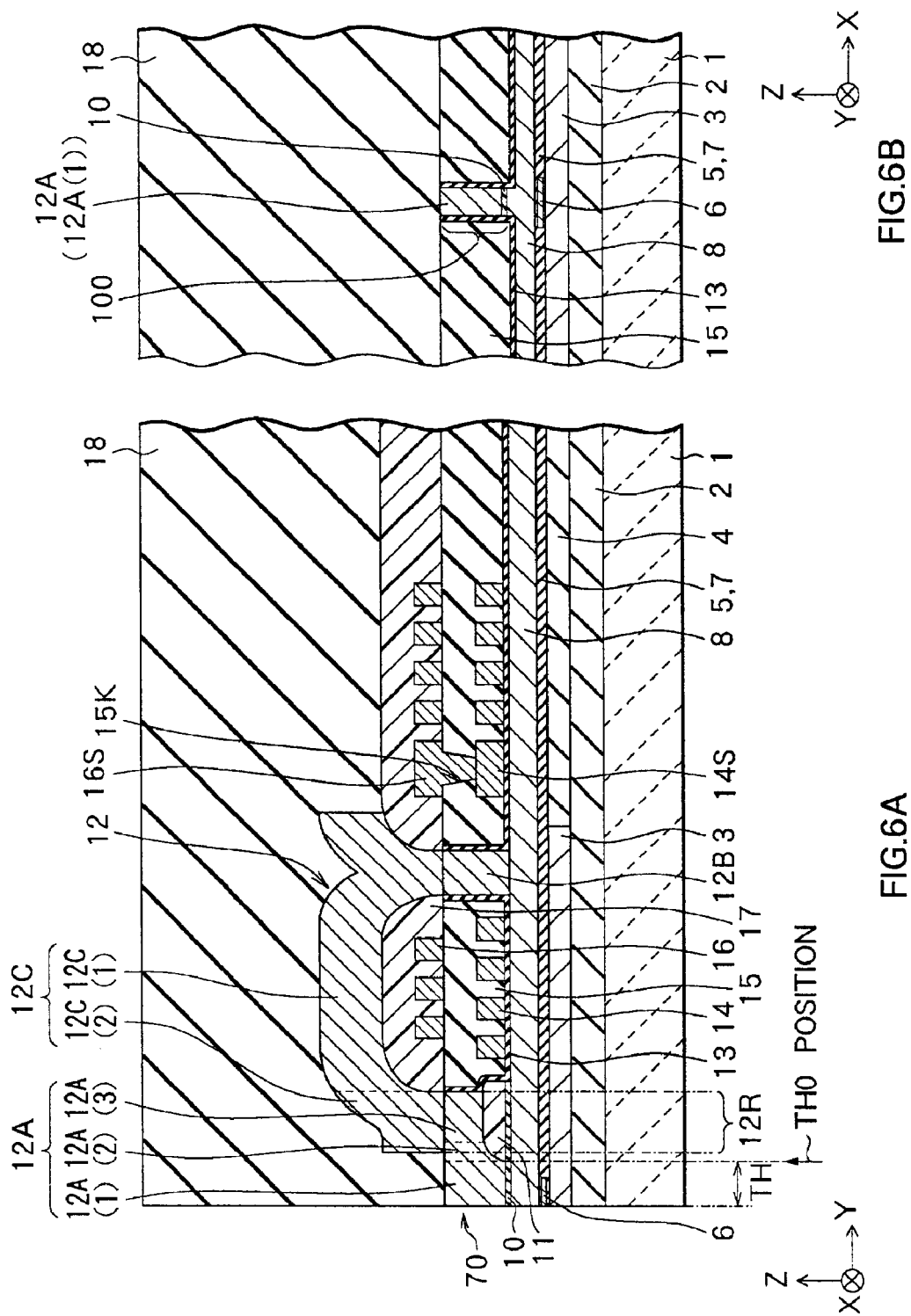
FIGS. 6A and 6B are cross sections for explaining a process subsequent to FIGS. 5A and 5B, respectively.
Figure 7:
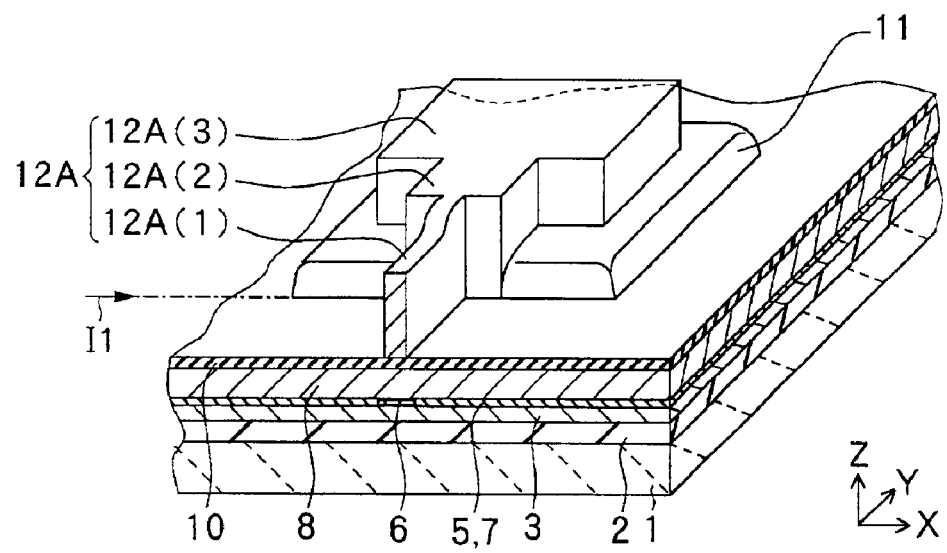
FIG. 7 is a perspective view corresponding to the cross sections shown in FIGS. 1A and 1B.
Figure 8:
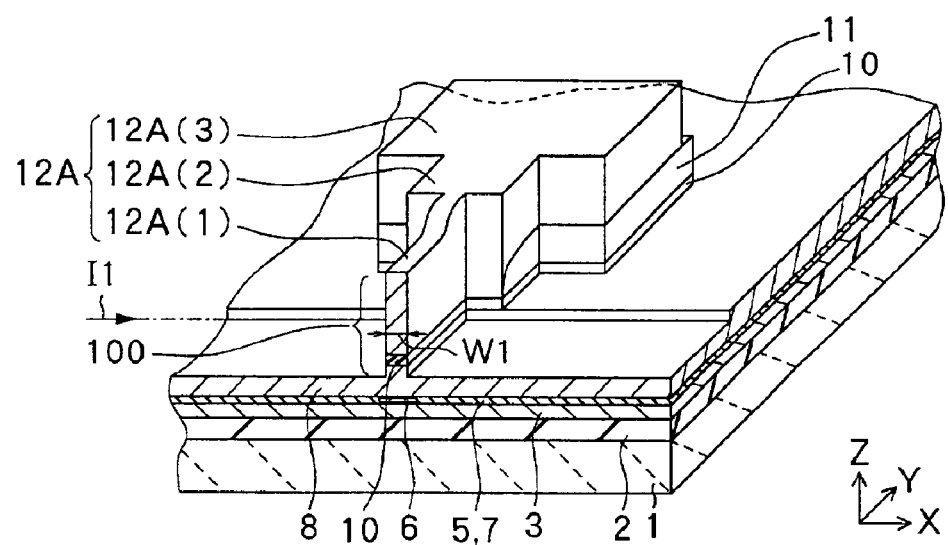
FIG. 8 is a perspective view corresponding to the cross sections shown in FIGS. 2A and 2B.
Figure 9:
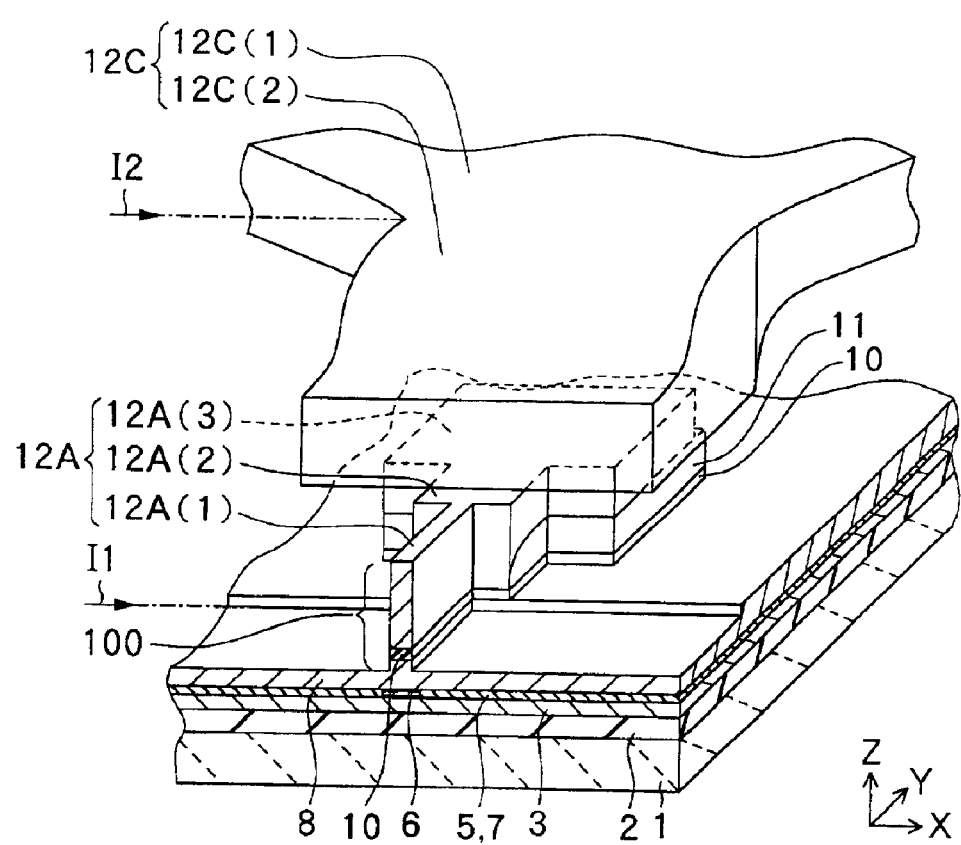
FIG. 9 is a perspective view corresponding to the cross sections shown in FIGS. 5A and 5B.

In FIGS. 1A and 1B to FIGS. 6A and 6B, FIGS. 1A to 6A show cross sections each of which is perpendicular to the air bearing surface and FIGS. 1B to 6B show cross sections each of which is parallel to the air bearing surface of the pole portion. FIGS. 7 to 9 show perspective structures corresponding to main manufacturing processes. Here, FIG. 7 corresponds to a state shown in FIGS. 1A and 1B. FIG. 8 corresponds to a state shown in FIGS. 2A and 2B. FIG. 9 corresponds to a state shown in FIGS. 5A and 5B. However, insulating films 13, 15 and 17, thin film coils 14 and 16, an overcoat layer 18 and the like shown in FIGS. 6A and 5B are omitted in FIG. 9.

In the following description, the X axis direction in each of FIGS. 1A and 1B to FIGS. 6A and 6B and FIGS. 7 to 9 is described as "width direction", the Y axis direction is described as "length direction", and the Z axis direction is described as "thickness (height) direction or depth direction". The side which is close to an air bearing surface 70 in the Y axis direction (or a side which will be the air bearing surface 70 in a following process) is described as "front side (or forward)" and the opposite side is described as "rear side (or rearward)".

<Method of Manufacturing Thin Film Magnetic Head>

Figure 10:
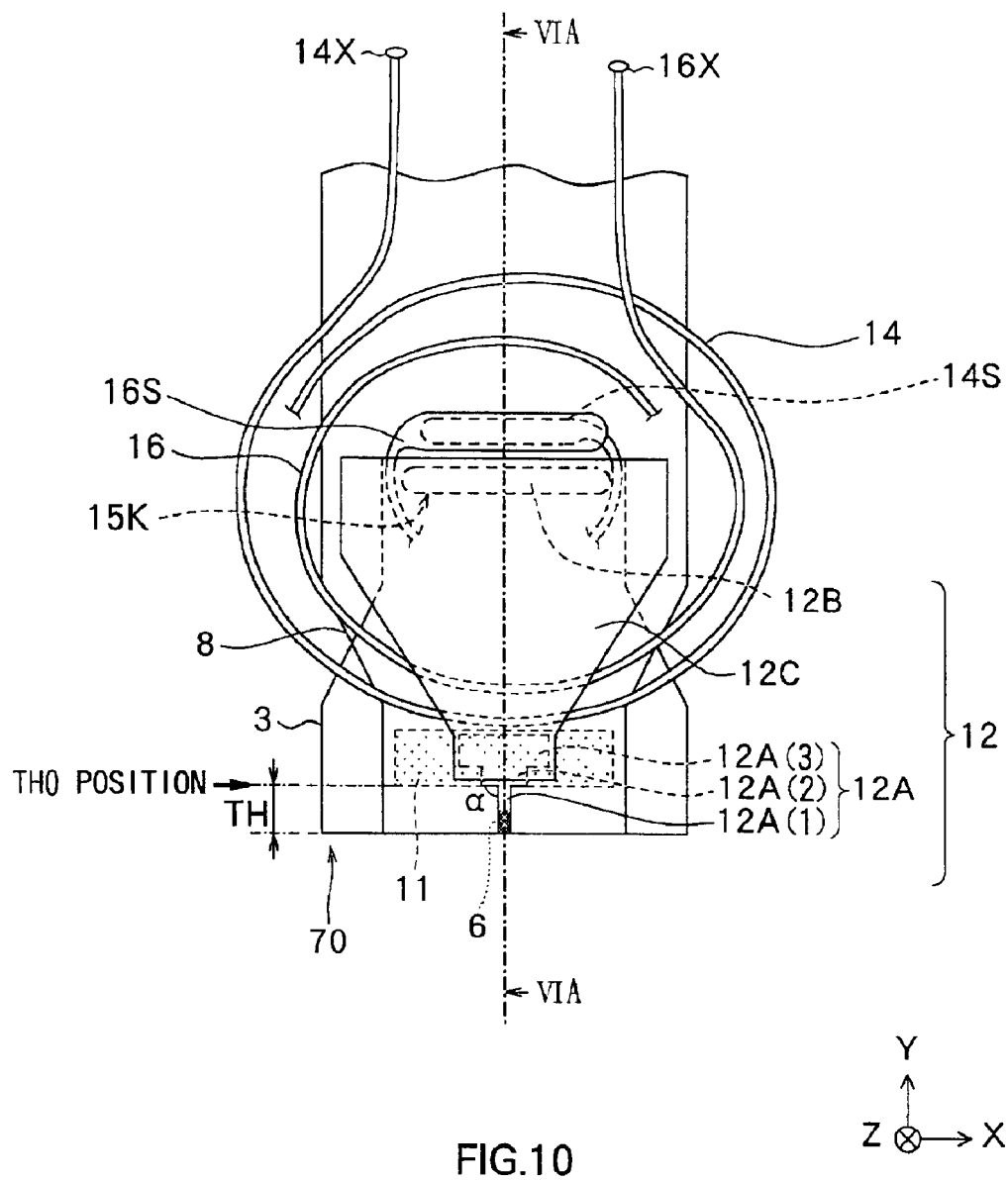
FIG. 10 is a plan view showing the plane structure of the thin film magnetic head according to the first embodiment of the invention.

In the manufacturing method according to the embodiment, first, as shown in FIGS. 1A and 1B, an insulating layer 2 made of, for example, aluminum oxide ($Al_2O_3$; hereinbelow, referred to as "alumina") is deposited in a thickness of about 5.0 μm to 10.0 μm on a substrate 1 made of, for example, altic ($Al_2O_3$ with TiC). Then, a bottom shield layer 3 for a reproducing head is formed by selectively depositing, for example, nickel iron alloy (NiFe;

hereinbelow, simply referred to as "Permalloy (trade name)") in a thickness of about 2.0 $\mu$m to 3.0 $\mu$m on the insulating layer 2 by using, for example, a frame plating method. Details of the frame plating method will be described hereinlater. The bottom shield layer 3 is formed, for example, so as to have a plane shape as shown in FIG. 10 which will be described hereinlater. Incidentally, as Permalloy for forming the bottom shield layer 3, for example, Permalloy having the composition of Ni: 80 percent by weight and Fe: 20 percent by weight, or Ni: 45 percent by weight and Fe: 55 percent by weight is used. Subsequently, an alumina layer or the like is formed in a thickness of about 4.0 $\mu$m to 5.0 $\mu$m so as to cover the entire surface. After that, the surface of the alumina layer is polished by, for example, CMP (Chemical Mechanical Polishing) method until the bottom shield layer 3 is exposed, thereby planarizing the entire surface. As a result of this, an insulating layer 4 is formed so as to embed the peripheral region of the bottom shield layer 3.

Subsequently, as shown in FIGS. 1A and 1B, an shield gap film 5 made of, for example, alumina is formed in a thickness of about 10.0 nm to 20.0 nm on the bottom shield layer 3 by, for example, sputtering. Then, an MR film 6 for constructing an MR element as the main part of the reproducing head is formed on the shield gap film 5 so as to be in a desired shape by using a high-precision photolithography process. Next, lead layers (not shown) as lead electrode layers to be electrically connected to the MR film 6 are formed on both sides of the MR film 6. Then, a shield gap film 7 is formed on the lead layers, the shield gap film 5, and the MR film 6, thereby embedding the MR film 6 in the shield gap films 5 and 7. The forming material, the forming method and the like of the shield gap film 7 are almost the same as those in the case of the shield gap film 5.

Subsequently, as shown in FIGS. 1A and 1B, a top shield layer-cum-bottom pole (hereinbelow, simply referred to as "bottom pole") 8 made of a magnetic material having a high saturation magnetic flux density such as iron nitride (FeN) is selectively formed on the shield gap film 7 in a thickness of about 2.0 $\mu$m to 2.5 $\mu$m. The bottom pole 8 is formed, for example, so as to have a plane shape as shown in FIG. 10 which will be described hereinlater.

Here, the formation of the bottom pole 8 is carried out through the steps as follow. Specifically, first, the iron nitride layer is formed on the shield gap film 7 in a thickness of about 2.0 $\mu$m to 2.5 $\mu$m by sputtering. Subsequently, the iron nitride layer is etched and patterned through, for example, reactive ion etching (hereinbelow, simply referred to as "RIE") by using a mask having predetermined shape, the mask being made of a material such as chromium, thereby selectively forming the bottom pole 8. In the case where the bottom pole 8 is formed by using the etching process according to the RIE, especially with the objectives of, for example, shortening the processing time and improving the processing accuracy, it is preferable to adjust the etching conditions such as the kind of the etching gas used at the time of etching and the processing temperature at the time of etching. Details of adjusting such etching conditions will be described hereinlater. Incidentally, as the forming material of the bottom pole 8, in addition to iron nitride, for example, an amorphous alloy or the like such as cobalt iron alloy (FeCo), zirconium cobalt iron alloy oxide (FeCoZrO) or zirconium iron alloy nitride (FeZrN) as a magnetic material having a high saturation magnetic flux density like iron nitride may be used. As the etching method for patterning the iron nitride layer, the RIE does not always have to be used, but ion milling may be used. Here, a series of structures from the substrate 1 to the shield gap film 7 corresponds to an example of "predetermined substrate" in the invention. The bottom pole 8 corresponds to an example of "first magnetic layer" in the invention.

Subsequently, as shown in FIGS. 1A and 1B, a write gap layer 10 made of a non-magnetic material such as alumina is formed on the bottom pole 8 in a thickness of about 0.1 $\mu$m to 0.15 $\mu$m by, for example, sputtering. The write gap layer 10 is formed so as not to cover a region where a magnetic path connection portion 12B will be formed in a following process. This region will be an opening 10K for connecting the bottom pole 8 and a top pole 12 which will be formed in a following process. Incidentally, as the forming material of the write gap layer 10, in addition to the above-described alumina, a non-magnetic metal material like alumina such as nickel copper alloy (NiCu) or the like may be used. Here, the write gap layer 10 corresponds to an example of "gap layer" in the invention.

Subsequently, in a predetermined position on the write gap layer 10 in a region forward of the forming region of the opening 10K, for example, an organic photoresist film is selectively formed in a thickness of about 1.0 $\mu$m by a high-precision photolithography process. Next, a heat treatment is conducted on the photoresist film, for example, at a temperature within the range of 200° C. to 250° C. By this heat treatment, the photoresist film close to its end edge is rounded and inclined downward to the end edge. As a result, an insulating film pattern 11 is selectively formed as shown in FIG. 1A. The above-described "predetermined position" at the time of forming the insulating film pattern 11 is, for example, a position in which the front end of the insulating film pattern 11 recedes rearward of the rear end of the MR film 6.

Subsequently, as shown in FIGS. 1A and 1B and FIG. 7, in a region extending from the region including the inclined portion on the front side of the insulating film pattern 11 onto the write gap layer 10 forward thereof, a top pole tip 12A is selectively formed in a thickness of about 1.5 $\mu$m to 2.5 $\mu$m by the frame plating method or the like. The top pole tip 12A is made of a magnetic material having a high saturation magnetic flux density and including iron (Fe), nickel (Ni) and cobalt (Co), such as iron nickel cobalt alloy (CoNiFe; Co: 45 percent by weight, Ni: 30 percent by weight, Fe: 25 percent by weight). At the time of forming the top pole tip 12A, simultaneously, the magnetic path connection portion 12B is selectively formed on the exposed surface of the bottom pole 8 in the opening 10K. Each of the top pole tip 12A and the magnetic path connection portion 12B composes part of the top pole 12. Incidentally, as the forming material of the top pole tip 12A and the magnetic path connection portion 12B, a material including at least one kind of element out of chromium (Cr), boron (B), phosphorus (P) and copper, together with the above-described three metal elements, may be used.

The top pole tip 12A is formed, for example, as shown in FIG. 10 which will be described hereinlater, so as to include a front end part 12A(1), an intermediate part 12A(2) and a rear end part 12A(3) in accordance with the order from the side which will be the air bearing surface 70 in the following process (the left side in FIG. 1A). At this time, the front end part 12A(1) is made to have a uniform width (about 0.1 $\mu$m to 0.2 $\mu$m) which specifies a recording track width on a recording medium. Furthermore, for example, while a coupling position I1 of the front end part 12A(1) and the intermediate part 12A(2) is set to coincide with the position of the front end of the insulating film pattern 11, the rear end of the rear end part 12A(3) is set to be positioned forward of the rear end of the insulating film pattern 11. In this connection, the structural characteristics of the top pole tip 12A will be described hereinlater. Here, the front end part 12A(1) in the top pole tip 12A corresponds to an example of "uniform width portion" in the invention.

At the time of forming the top pole tip 12A by the frame plating method, for example, an electrode film (not shown) serving as a seed layer in an electroplating method is first formed in a thickness of about 70 nm by sputtering. As the forming material of the electrode film, for example, iron nickel cobalt alloy (Co: 45 percent by weight, Ni: 30 percent by weight, Fe: 25 percent by weight) having a high saturation magnetic flux density or the like is used. Then, by applying a positive photoresist (hereinbelow, simply referred to as "photoresist") or the like on the electrode film, a photoresist film (not shown) is formed. Subsequently, by using a mask (not shown) with a pattern in a predetermined shape, a predetermined region in the photoresist film is selectively exposed. Subsequently, by developing the exposure region in the photoresist film, a frame pattern (outer frame; not shown) which will be used at the time of performing the plating process in the frame plating method is formed. The frame pattern is provided with an opening corresponding to the above exposure region. Then, by using the frame pattern as a mask and using the electrode film which is formed in the preceding process as a seed layer, the top pole tip 12A made of iron nickel cobalt alloy (Co: 45 percent by weight, Ni: 30 percent by weight, Fe: 25 percent by weight) is formed by the electroplating method. After all, the frame pattern is removed. Incidentally, the magnetic path connection portion 12B is also formed by using the forming material and the forming method similar to those in the case of the above-described top pole tip 12A.

Figures 2A, 2B:
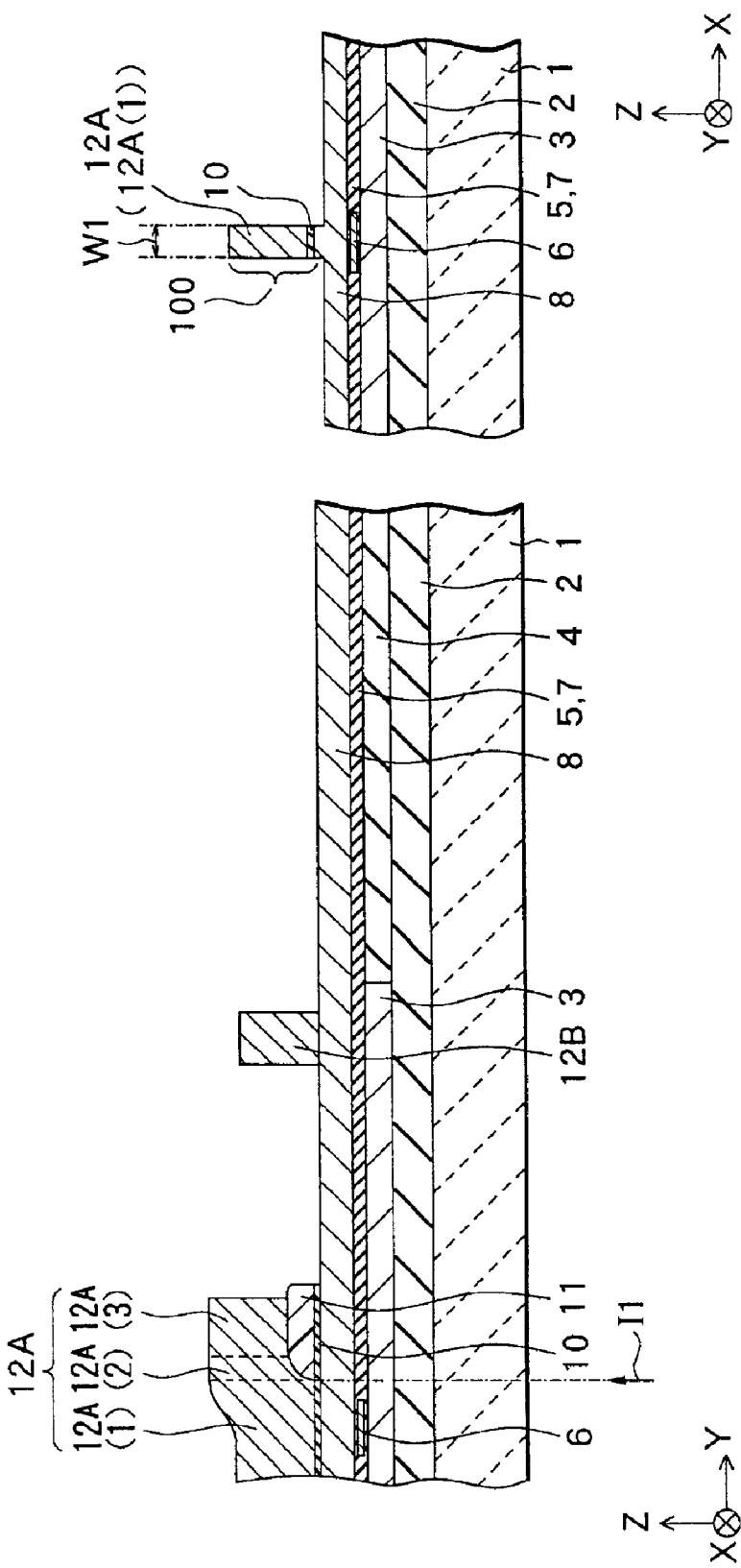
FIGS. 2A and 2B are cross sections for explaining a process subsequent to FIGS. 1A and 1B, respectively.

Subsequently, the etching process is conducted on the entire surface by the RIE with the top pole tip 12A as a mask. Through the etching process, as shown in FIGS. 2A and 2B and FIG. 8, a region in the write gap layer 10 other than the disposing region of the top pole tip 12A and the insulating film pattern 11 is selectively removed. At this time, by adjusting the etching conditions which will be described hereinlater, for example, rear part in the insulating film pattern 11 is also removed. At the time of performing the etching process, especially, the etching gas including at least chlorine ($Cl_2$) and boron trichloride ($BCl_3$), out of a main gas group consisted of chlorine, boron trichloride, hydrogen chloride (HCl), carbon tetrafluoride ($CF_4$), sulfur hexafluoride ($SF_6$) and boron tribromide ($BBr_3$) with the addition such as hydrogen ($H_2$), oxygen ($O_2$), nitrogen ($N_2$), argon (Ar) and the like is used, and the processing temperature is set to be within the range of 30° C. to 300° C. It is more preferable to use a gas including chlorine and boron trichloride only out of the main gas group. In this case, for example, it is preferable to set the supplied amount of chlorine gas within the range of 20 milliliters per minute to 40 milliliters per minute, and to set the supplied amount of boron trichloride gas within the range of 60 milliliters per minute to 80 milliliters per minute. Furthermore, it is more preferable to set the processing temperature within the range of 150° C. to 250° C.

Moreover, the etching process is conducted on the entire surface by the RIE with the top pole tip 12A as a mask. Through the etching process, as shown in FIGS. 2A and 2B and FIG. 8, the bottom pole 8 in a region forward of the coupling position I1 of the front end part 12A(1) and the intermediate part 12A(2) in the top pole tip 12A is selectively removed to a predetermined depth, and thereby a pole portion 100 having a trim structure is formed. At the time of performing the etching process, for example, the bottom pole 8 is set to be dug down by about 0.2 $\mu$m to 0.4 $\mu$m. The pole portion 100 consists of the front end part 12A(1) in the top pole tip 12A, part of the write gap layer 10 and part corresponding to the front end part 12A(1) of the bottom pole 8. The above parts composing the pole portion 100 are formed so as to have a width W1 which is almost the same as that of each other, respectively. At the time of performing the etching process, especially, the etching gas including at least chlorine out of chlorine, boron trichloride, hydrogen chloride, carbon tetrafluoride, sulfur hexafluoride and boron tribromide with the addition such as hydrogen, oxygen, nitrogen, argon and the like is used, and the processing temperature is set to be within the range of 30° C. to 300° C. (more preferably, 150° C. to 250° C.). As a result of this, the appropriate etching speed (about 200 nm/min. to 300 nm/min.) and the appropriate etching profile can be assured. In this case, for example, it is preferable to set the supplied amount of chlorine gas within the range of 100 milliliters per minute to 200 milliliters per minute.

Figures 3A, 3B:
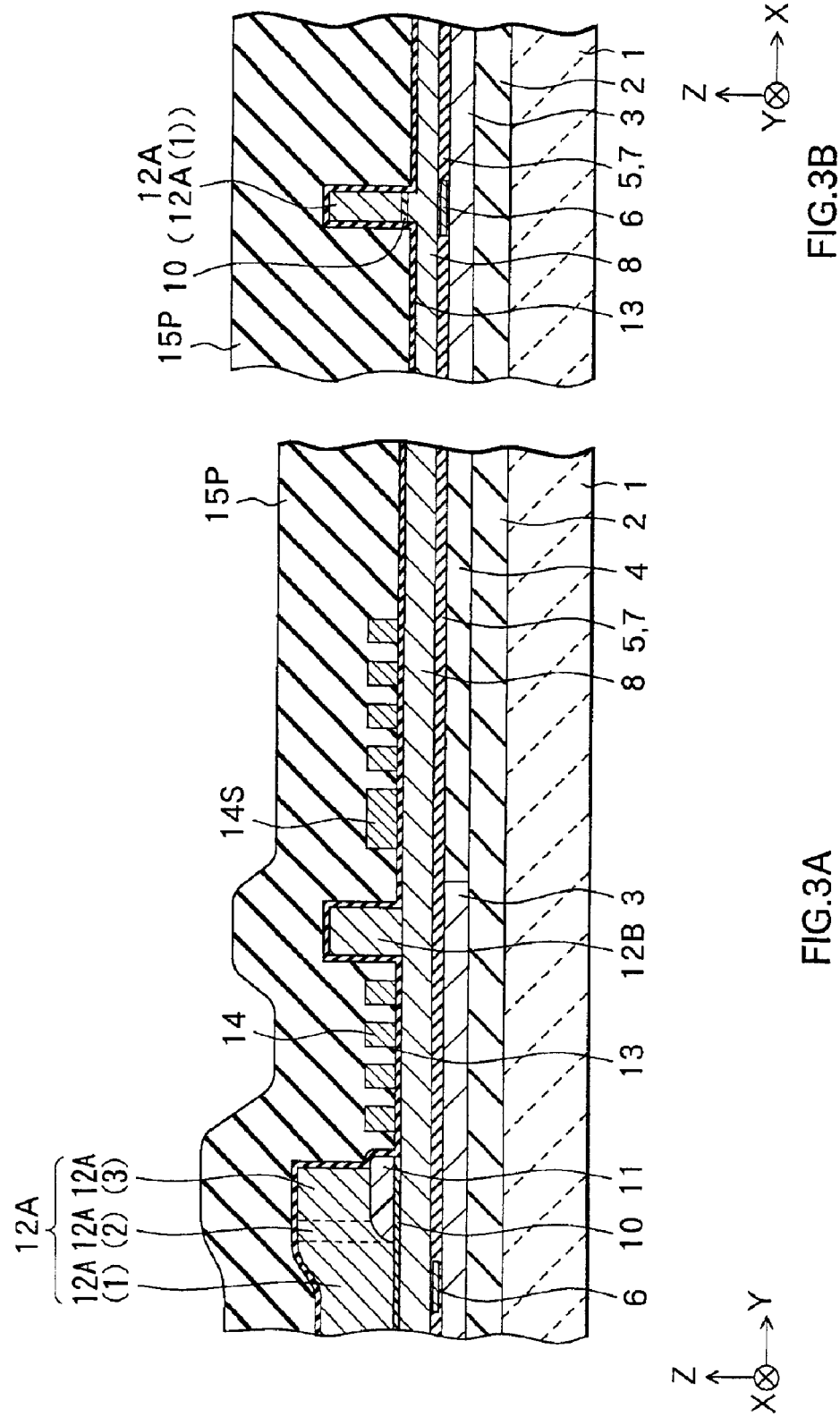
FIGS. 3A and 3B are cross sections for explaining a process subsequent to FIGS. 2A and 2B, respectively.

Subsequently, as shown in FIGS. 3A and 3B, an insulating film 13 made of alumina or the like is formed in a thickness of about 0.2 $\mu$m to 0.5 $\mu$m so as to cover the entire surface.

Subsequently, as shown in FIG. 3A, on the insulating film 13 in a region (exclusive of the disposing region of the magnetic path connection portion 12B) rearward of the forming region of the top pole tip 12A, a thin film coil 14 for the inductive recording head made of copper or the like is selectively formed in a thickness of about 0.8 $\mu$m to 1.2 $\mu$m by, for example, the electroplating method. The thin film coil 14 is formed, for example, so as to have a winding structure as shown in FIG. 10 which will be described hereinlater. Incidentally, in FIG. 3A, only one part is shown with respect to the thin film coil 14. At the time of forming the thin film coil 14, simultaneously a coil connection portion 14S which will be the inner terminating end thereof is formed integrally with the thin film coil 14 on the insulating film 13. The coil connection portion 14S is for electrically connecting the thin film coil 14 as a first layer to a thin film coil 16 (coil connection portion 16S; refer to FIG. 4A) as a second layer which will be formed in a following process.

Subsequently, as shown in FIGS. 3A and 3B, a precursory insulating layer 15P made of alumina or the like is formed in a thickness of about 3.0 $\mu$m by, for example, sputtering so as to cover the entire surface, thereby bridging a gap in a region having an uneven structure which is constructed of the top pole tip 12A, the magnetic path connection portion 12B, the thin film coil 14 and the like.

Figures 4A, 4B:
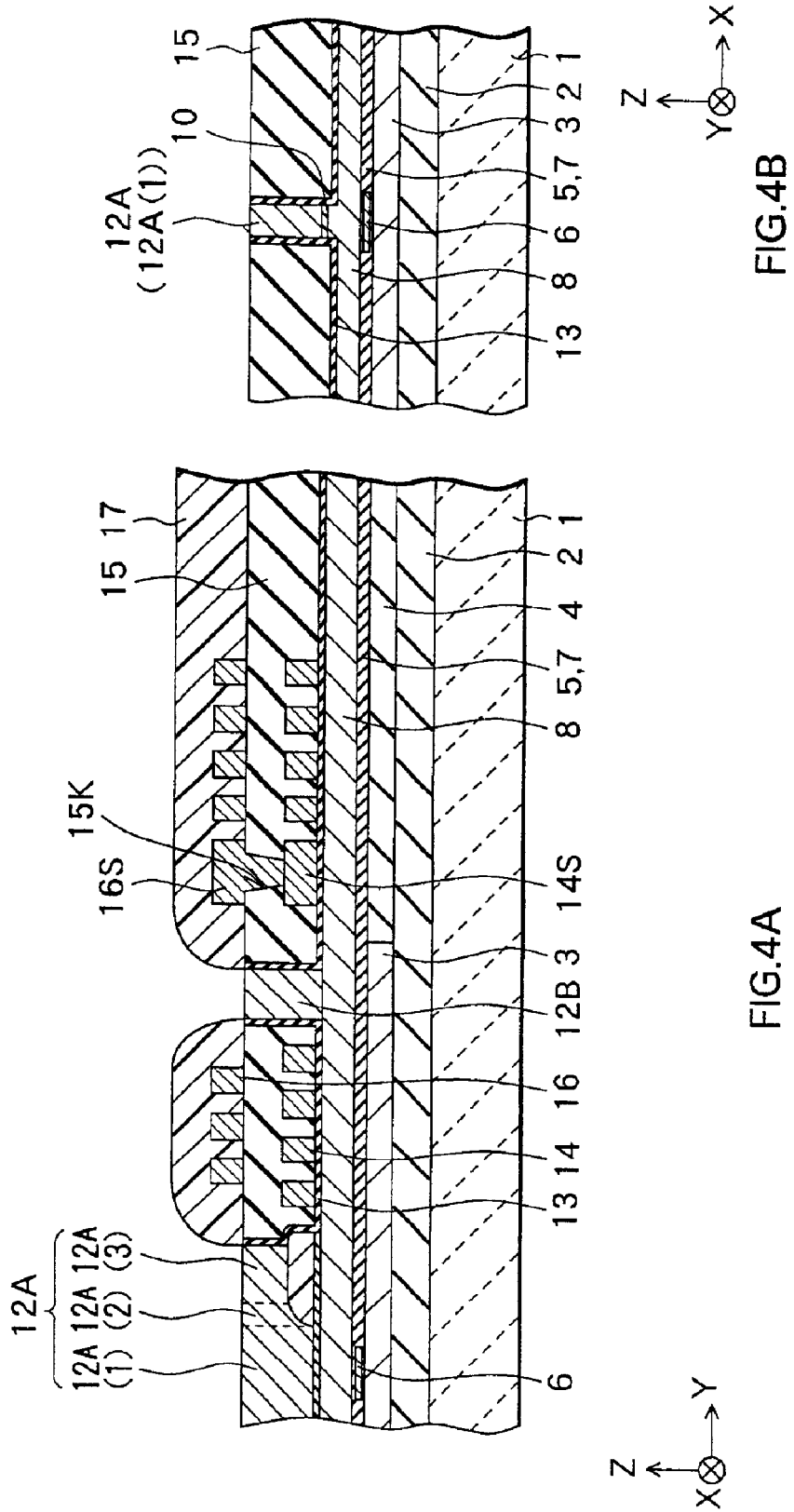
FIGS. 4A and 4B are cross sections for explaining a process subsequent to FIGS. 3A and 3B, respectively.

Subsequently, the entire surface of the precursory insulating layer 15P is polished by, for example, the CMP method so as to be planarized. By the polishing treatment, as shown in FIGS. 4A and 4B, an insulating film 15 covering the thin film coil 14 and the like is formed. The polishing treatment at this time is performed at least until the magnetic path connection portion 12B is exposed.

Subsequently, as shown in FIG. 4A, the insulating film 15 covering the top face of the coil connection portion 14S is partially etched by, for example, the RIE or ion milling so as to form an opening 15K.

Subsequently, as shown in FIG. 4A, on the planarized insulating film 15 above the thin film coil 14, the second thin film coil 16 made of copper or the like is selectively formed in a thickness of about 0.8 $\mu$m to 1.2 $\mu$m by, for example, the electroplating method. At the time of forming the thin film coil 16, simultaneously, the coil connection portion 16S which will be the inner terminating end thereof is formed integrally with the thin film coil 16 on the exposed surface of the coil connection portion 14S in the opening 15K. The thin film coil 14 and the thin film coil 16 are electrically connected with the coil connection portions 14S and 16S in-between in the opening 15K. Here, the thin film coils 14 and 16, and the coil connection portions 14S and 16S correspond to an example of "thin film coil" in the invention.

Subsequently, by a high-precision photolithography process, for example, an organic photoresist film is selectively formed in a thickness of about 2.0 μm so as to cover the thin film coil 14 and the like. After that, a heat treatment is conducted on the photoresist film at a temperature within the range of, for example, 200° C. to 250° C. By the heat treatment, as shown in FIG. 4A, an insulating film 17 covering the thin film coil 16 and the like is selectively formed. The insulating film 17 is formed so as not to cover the top face of the magnetic path connection portion 12B. Here, the insulating films 13, 15 and 17 correspond to an example of "insulating layer" in the invention.

Subsequently, as shown in FIG. 5A and FIG. 9, in a region extending from the rear region on the top pole tip 12A, over the insulating film 17, and onto the neighboring region of the magnetic path connection portion 12B, a top yoke 12C made of a magnetic material having a high saturation magnetic flux density such as Permalloy is selectively formed in a thickness of about 2.5 μm to 3.5 μm by, for example, the frame plating method. In this connection, Permalloy having the composition of Ni: 80 percent by weight and Fe: 20 percent by weight, or the composition of Ni: 45 percent by weight and Fe: 55 percent by weight is used.

The top yoke 12C is formed, for example, so as to include a yoke part 12C(1) and a connection part 12C(2) as shown in FIG. 10 which will be described hereinlater. Additionally, the top yoke 12C is formed, for example, so that the position of the front end of the connection part 12C(2) recedes rearward of the coupling position I1 of the front end part 12A(1) and the intermediate part 12A(2) in the top pole tip 12A, and so that a coupling position 12 of the yoke part 12C(1) and the connection part 12C(2) coincides with the position of the front end of the insulating film 17. The top yoke 12C is, in the rear part thereof, magnetically coupled to the bottom pole 8 with the magnetic path connection portion 12B in-between. At the same time, the top yoke 12C is, in the front part thereof, partially overlapped with and magnetically coupled to one part on the rear side of the top pole tip 12A. In other words, the top pole 12 (the top pole tip 12A, the magnetic path connection portion 12B and the top yoke 12C) and the bottom pole 8 are connected, thereby forming a propagation path of the magnetic flux, that is, a magnetic path. In this connection, the structural characteristics of the top yoke 12C will be described hereinlater. Here, the top pole 12 constructed of the top pole tip 12A, the magnetic path connection portion 12B and the top yoke 12C corresponds to an example of "second magnetic layer" in the invention.

Subsequently, as shown in FIGS. 5A and 5B, an overcoat layer 18 made of an insulating material, more specifically, an inorganic insulating material such as alumina or the like is formed in a thickness of about 20 μm to 40 μm so as to cover the entire surface.

After all, as shown in FIGS. 6A and 6B, the air bearing surface 70 of the recording head and the reproducing head is formed through machining work and polishing process, and thereby a thin film magnetic head is completed.

<Structure of Thin Film Magnetic Head>

Referring now to FIG. 10, the plane structure of the thin film magnetic head according to the embodiment will be described.

FIG. 10 schematically shows the plane structure of the thin film magnetic head manufactured by the method of manufacturing the thin film magnetic head according to the embodiment. Incidentally, in FIG. 10, the insulating films 13, 15, and 17, the overcoat layer 18 and the like are omitted. Moreover, only one part of the outermost region is shown with respect to the thin film coil 14 and 16. FIG. 6A corresponds to a cross section taken along line VIA—VIA in FIG. 10. In this connection, each mark with respect to the X, Y and Z axes directions in FIG. 10 denotes as in the case of FIGS. 1A and 1B to FIGS. 6A and 6B, and FIGS. 7 to 9.

The position of the front end of the insulating film pattern 11 is the position as a reference at the time of determining the throat height (TH), that is, the throat height zero position (TH0 position), which is one of factors in determining the performance of the recording head. The throat height (TH) is specified as a length from the position (TH0 position) of the front end of the insulating film pattern 11 to the air bearing surface 70.

The top pole tip 12A, as described above, includes the front end part 12A(1), the intermediate part 12A(2) and the rear end part 12A(3) in accordance with the order from the air bearing surface 70. Any of these parts has, for example, a plane shape like a rectangle, respectively. The width of each part is made to be wider in accordance with the order of the front end part 12A(1), the intermediate part 12A(2) and the rear end part 12A(3). In the coupling portion between the front end part 12A(1) and the intermediate part 12A(2), a step in the width direction is formed. An angle a at a corner part where a step face at the step part and a side edge face of the front end part 12A(1) intersects is, for example, 90 degrees. Furthermore, the angle a at the corner part is not necessarily limited to the above, but can be preferably set to be within the range of, for example, 90 degrees to 120 degrees. This is because the flow of the magnetic flux flowed from the intermediate part 12A(2) into the front end part 12A(1) can be smoothed by setting the angle a within the above-described range.

The top yoke 12C, as described above, includes the yoke part 12C(1) for accommodating the magnetic flux generated by the thin film coils 14 and 16, and the connection part 12C(2) for magnetically coupling with the top pole tip 12A. The width of the yoke part 12C(1) is, for example, almost uniform in the rear part thereof, and is narrowed gradually with approaching the air bearing surface 70 in the front part thereof. The connection part 12C(2) has, for example, a plane shape like a rectangle, and the width thereof is wider than the width of the rear end part 12A(3). The center in the width direction of the respective parts constructing each of the top pole tip 12A and the top yoke 12C coincides with each other.

Each of the thin film coils 14 and 16 is, as described above, a winding body having a spiral shape in plane. A terminal 14X forming the outer terminating end of the thin film coil 14 and a terminal 16X forming the outer terminating end of the thin film coil 16 are both connected with an external circuit which is not shown in the drawings. The external circuit makes it possible to pass a current through the thin film coils 14 and 16.

<Action of Thin Film Magnetic Head>

In the thin film magnetic head, upon the passage of electric current through the thin film coils 14 and 16 by means of the external circuit (not shown) at the time of recording information, magnetic flux is accordingly generated. The magnetic flux generated at this time propagates through the top yoke 12C from the yoke part 12C(1) to the connection part 12C(2), and further flows into the rear end part 12A(3) of the top pole tip 12A. The magnetic flux that has flowed into the rear end part 12A(3) propagates by way of the intermediate part 12A(2) to the front end part 12A(1), thereafter reaching the front end portion on the air bearing surface 70 side of the front end part 12A(1). The magnetic flux that has reached the front end portion of the front end part 12A(1) generates a signal magnetic field for recording on the outside near the write gap layer 10. By the signal magnetic field, the recording medium is partially magnetized so as to be able to record information.

On the other hand, upon reproducing, a sense current is passed through the MR film 6 in the reproducing head. A resistance value of the MR film 6 changes in accordance with a reproducing signal magnetic field from the magnetic recording medium. By detecting the change in resistance on the basis of a change in the sense current, information recorded on the magnetic recording medium can be read out.

<Effects of First Embodiment>

In the present embodiment, after the front end part 12A(1) of the top pole tip 12A is formed so as to have the extremely minute uniform width W1, both of the write gap layer 10 and the bottom pole 8 are selectively removed through the RIE with the front end part 12A(1) as a mask, and thereby the pole portion 100 is formed. Consequently, the width (pole width) of the pole portion 100 can be made uniform with high precision along the length direction, and the yield at the time of manufacturing the thin film magnetic head can be improved for the reasons as follow.

Figure 11A:
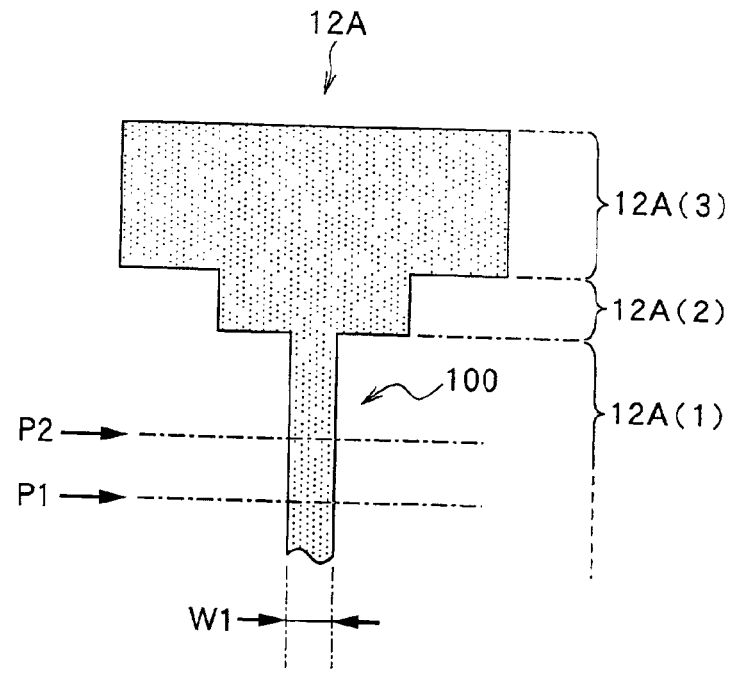
FIGS. 11A and 11B are diagrams for explaining the action with regard to the method of manufacturing the thin film magnetic head according to the first embodiment of the invention.
Figure 11B:
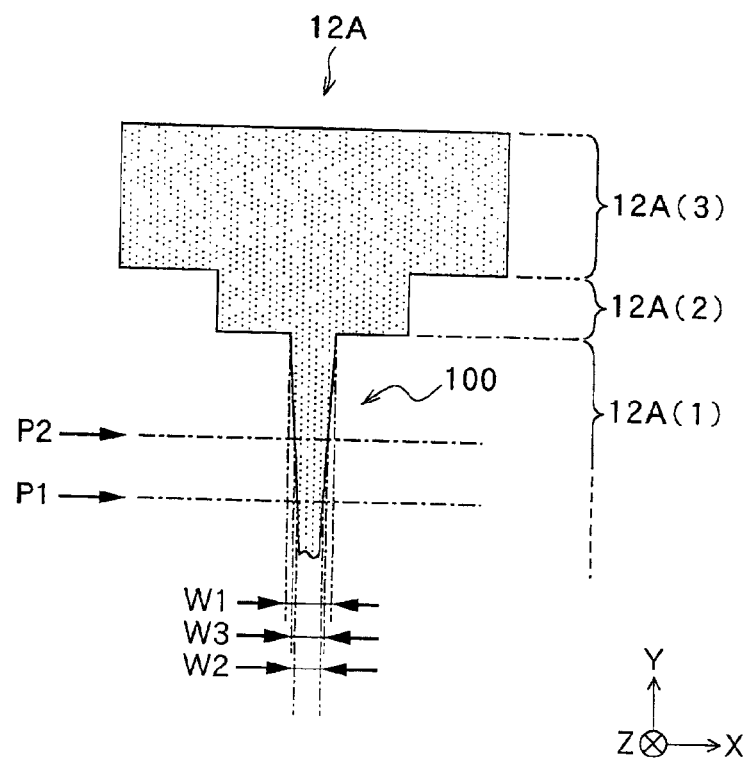

FIGS. 11A and 11B are diagrams for explaining the advantages in the method of manufacturing the thin film magnetic head according to the embodiment. FIGS. 11A and 11B show the plane structure around the pole portion 100 (of the top pole tip 12A) formed by the method (RIE) of manufacturing the thin film magnetic head according to the embodiment and the plane structure around the pole portion 100 formed by the conventional method (ion milling) of manufacturing the thin film magnetic head, under magnification, respectively.

When manufacturing the thin film magnetic head, especially, in order to assure the stable recording track density, it is necessary to make the pole width uniform with high precision along the length direction. However, in the conventional case shown in FIG. 11B, for the ion milling is used as an etching method of forming the pole portion 100, the pole width is, for example, gradually getting narrower than the width W1 with approaching the side (the underside in the drawing) which will be the air bearing surface in a following process. For example, when the top pole tip 12A and the like are rotated about the Z axis in the drawing and the ion beam is applied in such a direction as forms an angle within the range of 40 degrees to 75 degrees with respect to the Z axis, the intermediate part 12A(2) and the rear end part 12A(3) having large areas act as barriers against the ion beam, so that the irradiation amount of ion beam to the rear region of the front end part 12A(1) is reduced. Therefore, the irradiation amount of ion beam to the peripheral region of the front end part 12A(1) gradually gets small from the front region toward the rear region in the front end part 12A(1). The difference in the irradiation amount of ion beam causes the difference in the etching amount, thereby making the pole width to be uneven. In such a case, when the front region of the pole portion 100 is polished at the time of polishing process for forming the air bearing surface in a following process, for example, the pole width in the case of being polished until a position P1 is W2 (W2<W1), and the pole width in the case of being polished until a position P2 is W3 (W3<W1). That is to say, the pole width changes according to the polish position. The changes in the pole width depending on the polish position induce variations in the recording track density characteristics in the thin film magnetic head, so that the yield at the time of manufacturing is reduced.

Contrarily, in the case of the embodiment shown in FIG. 11A, for the RIE is used as an etching method, the etching process is performed in the perpendicular direction (direction parallel to the Z axis). Consequently, in contrast to the conventional case where the ion milling is used, the difference in the etching amount is not generated according to the position in the length direction and the peripheral region of the front end part 12A(1) is etched evenly, so that the pole width is uniform (W1) with high precision throughout the entire region of the pole portion 100 in the length direction. In such a case, the pole width does not changes according to the polish position (P1, P2) at the time of polishing process for forming the air bearing surface, but the stable recording track density is assured so that the yield at the time of manufacturing can be improved.

Better still, the etching speed in the case where the RIE is used is generally faster than the etching speed in the case where the ion milling is used. Consequently, as a result of using the RIE as an etching method, the etching process can be performed in a shorter time than the case of using the ion milling.

Furthermore, the etching conditions for the write gap layer 10 made of alumina having the property of being relatively hard and the etching conditions for the bottom pole 8 made of iron nitride having the property of being relatively soft are set separately, so that the etching conditions are adjusted so as to accelerate a chemical reaction in the etching process on each material. As a result, the etching process can be performed with higher precision and in a shorter time. As described above, it is preferable to set the processing temperature within the range of 30° C. to 300° C. for the following reasons. At a processing temperature lower than 30° C., the etching speed is too slow, so that productivity (the number of the thin film magnetic head manufactured per unit time) is decreased. On the other hand, at a processing temperature higher than 300° C., the etching amount is made uneven, and the magnetoresistive effect characteristics of the MR film 6 is deteriorated (specifically, the rate of resistance change is decreased) under the influence of high temperature so that the output thereof is decreased. In particular, by setting the processing temperature within the range of 150° C. to 250° C., the etching amount on both of the write gap layer 10 and the bottom pole 8 is made even and the etching speed is adjusted. This is preferable from the viewpoint of the productivity and the yield.

Furthermore, in the embodiment, a magnetic material including iron, nickel and cobalt, such as iron nickel cobalt alloy (CoNiFe), is used as a forming material of the top pole tip 12A. Generally, since the iron nickel cobalt alloy is a magnetic material harder than a magnetic material such as iron nitride and an inorganic insulating material such as alumina, the etching speed on the iron nickel cobalt alloy is slower than the etching speed on iron nitride or alumina. Specifically, for example, the etching amount on the top pole tip 12A made of iron nickel cobalt alloy is about 50% to 70% of the etching amount on the bottom pole 8 made of iron nitride or the write gap layer 10 made of alumina. As a result of this, at the time of etching process, the etching amount on the top pole tip 12A is made smaller than the etching amount on the write gap layer 10 and the bottom pole 8, so that the film loss of the top pole tip 12A can be suppressed. However, this does not mean that the etching process generates no "film loss" of the top pole tip 12A. Accordingly, when the top pole tip 12A is formed, it is preferable to assure its thickness necessarily and sufficiently. The etching amount (film loss amount) on the top pole tip 12A is adjustable by making changes to the etching conditions such as the kind of the etching gas, the processing temperature and the like.

In this connection, it is preferable that the iron nickel cobalt alloy as a forming material of the top pole tip 12A is used only in the case where the film thickness of the top pole tip 12A after completion is moderately thin (for example, no more than 3.0 μm), for the following reason. For example, when aiming at forming the top pole tip 12A having a thickness more than 3.0 μm with the iron nickel cobalt alloy used as a forming material, the iron nickel cobalt alloy partially cracks or peels off as a result of the accumulation of inner stress, and it is therefore difficult to form the top pole tip 12A as intended. In the embodiment, the top pole tip 12A is formed so as to have a thickness within the range of about 1.5 μm to 2.5 μm. Consequently, even in the case where a hard magnetic material such as iron nickel cobalt alloy is used, "cracking", "peeling off" or the like as described above can be avoided, so that the formation of the top pole tip 12A can be stabilized.

Furthermore, in the embodiment, an inorganic insulating material such as alumina is used as a forming material of the insulating film 15. Consequently, in contrast to the case where a soft insulating material such as photoresist is used, the polishing surface of a lapping plate of a CMP machine can be prevented from getting clogged at the time of polishing the surface of the precursory insulating layer 15P, and the surface after polished can be formed smoother.

Furthermore, in the embodiment, a magnetic material having a high saturation magnetic flux density (for example, iron nitride and iron nickel cobalt alloy) is used as both of forming materials of the bottom pole 8 and the top pole tip 12A. Consequently, even when the pole width is made extremely minute in order to increase the recording density, the magnetic flux saturating phenomenon is suppressed so that the propagation of the magnetic flux is smoothed. As a result of this, a sufficient amount of magnetic flux is supplied to the front end portion of the front end part 12A(1) in the top pole tip 12A, so that an excellent overwrite characteristics can be attained.

Furthermore, in the embodiment, as shown in FIG. 6A, part of the insulating film pattern 11 is disposed so as to be adjacent to the write gap layer 10 in an overlap region 12R in which the top yoke 12C and the top pole tip 12A overlap with each other, so that the invention contributes to the attainment of excellent overwrite characteristics in this point as well, for the reason as follows. That is to say, in the process of propagation of the magnetic flux flowing in the top pole 12, in the overlap region 12R, the flow of magnetic flux occurs in a downward direction from the connection part 12C(2) in the top yoke 12C toward the rear end part 12A(3) in the top pole tip 12A. Here, the part of the insulating film pattern 11, which is disposed in the overlap region 12R and made of a non-magnetic material, performs a function as a shield member of the magnetic flux so that the flow of magnetic flux from the upper region toward the lower region is suppressed. On this account, it can be suppressed that the magnetic flux flowed from the connection part 12C(2) into the rear end part 12A(3) passes through the write gap layer 10 and propagates to the bottom pole 8 (leakage of magnetic flux). Therefore, the propagation loss of the magnetic flux resulting from the "leakage of magnetic flux" is suppressed in the process of propagation of the magnetic flux in the top pole 12, so that a necessary and sufficient amount of magnetic flux can be supplied to the front end portion of the front end part 12A(1) in the top pole tip 12A. Incidentally, the part of the insulating film pattern 11 can, simultaneously with suppressing the propagation of magnetic flux from the top pole 12 to the bottom pole 8, suppress the propagation of magnetic flux from the bottom pole 8 to the top pole 12.

Furthermore, in the embodiment, the width of each part of the rear end part 12A(3), the intermediate part 12A(2) and the front end part 12A(1) which constitute the top pole tip 12A is narrowed in the order mentioned, so that the magnetic volume of each part, that is, the permissible volume of the magnetic flux that can be accommodated in each part is reduced in the same order as well. As a result of this, the magnetic flux flowed into the top pole tip 12A is converged step by step according to the step-by-step reduction of the magnetic volume in the process of propagating from the rear end part 12A(3) to the front end part 12A(1) so that the magnetic flux saturating phenomenon is suppressed in the process of propagation of the magnetic flux. From this fact, a sufficient amount of magnetic flux is supplied to the front end part 12A(1) so that this point also contributes to the attainment of excellent overwrite characteristics.

<Modification of First Embodiment>

Figure 12:
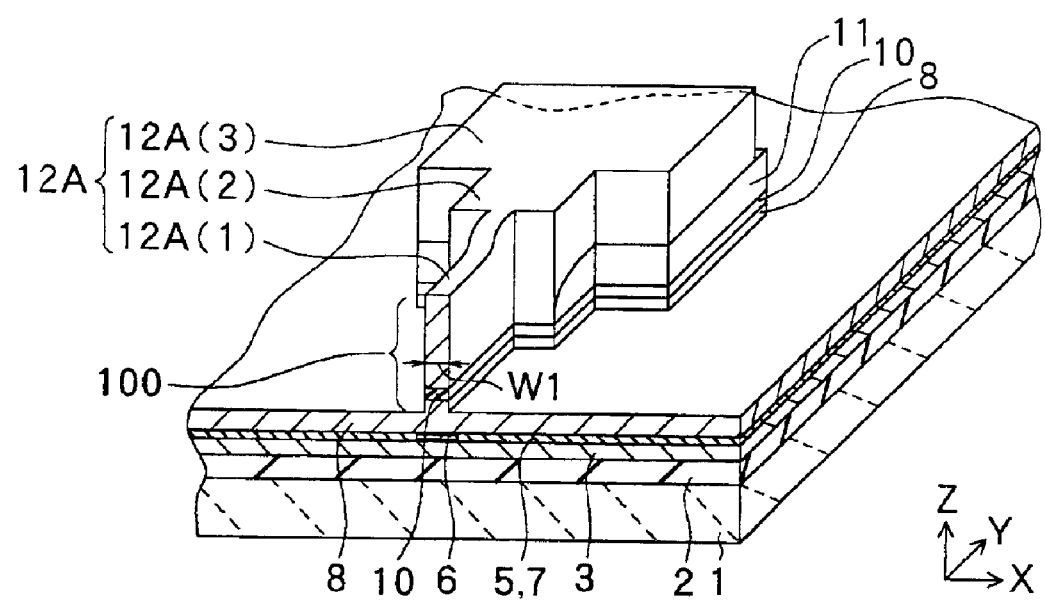
FIG. 12 is a perspective view showing a modification with regard to the structure of the thin film magnetic head according to the first embodiment of the invention.
Figures 13A, 13B:
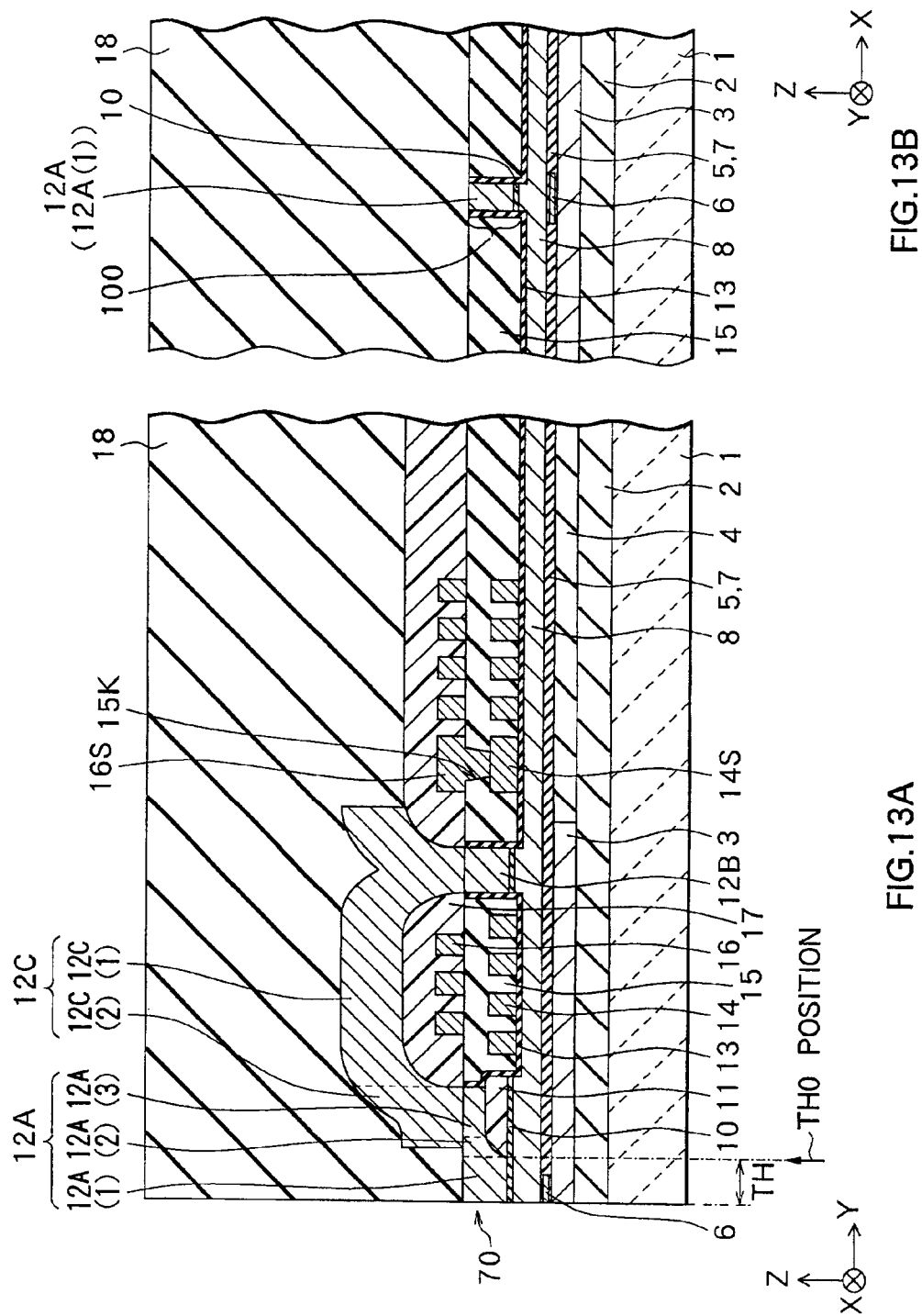
FIGS. 13A and 13B are cross sections corresponding to the perspective view shown in FIG. 12.

Incidentally, in the embodiment, as shown in FIG. 8, when forming the pole portion 100, the etching process is selectively conducted on the bottom pole 8 in the region forward of the coupling position I1 of the front end part 12A(1) and the intermediate part 12A(2) in the top pole tip 12A. However, the invention is not always limited to the above, but the range on which the etching process is to be conducted can be freely set. For example, as shown in FIG. 12 and FIGS. 13A and 13B, the etching process may be conducted throughout almost the entire region of the bottom pole 8. Here, FIG. 12 shows one process in the method of manufacturing the thin film magnetic head as a modification with regard to the method of manufacturing the thin film magnetic head according to the embodiment, corresponding to FIG. 8. On the other hand, FIGS. 13A and 13B show cross-sectional structure of the thin film magnetic head which is formed through the method of manufacturing the thin film magnetic head as a modification shown in FIG. 12, corresponding to FIGS. 6A and 6B. In such a case, the surface level of the underlayer (insulating film 13) on which the thin film coil 14 is to be formed becomes lower than the surface level of the underlayer in the case of the above-described embodiment (refer to FIGS. 6A and 6B). As a result of this, while forming the insulating film 15 having a sufficient thickness over the thin film coil 14, the thickness of the top pole tip 12A can be made thin. Therefore, in view of the connection between the material (iron nickel cobalt alloy) and the formed thickness of the top pole tip 12A as described above, the formation of the top pole tip 12A can be further stabilized. In passing, in FIGS. 13A and 13B, the structure except for the above-described point is similar to that shown in FIGS. 6A and 6B.

Furthermore, in the embodiment, alumina is used as the forming material of the write gap layer 10, and sputtering is used as the forming technique thereof. However, the invention is not always limited to the above. As the forming material of the write gap layer 10, in addition to alumina, an inorganic insulating material such as aluminum nitride (AlN), silicon oxide, silicon nitride or the like may be used, and a non-magnetic metal such as tantalum (Ta), titanium tungsten (TiW), titanium nitride (TiN) or the like may be also used. Furthermore, as the forming method of the write gap layer 10, in addition to sputtering, the CVD (Chemical Vapor Deposition) method may be used. By forming the write gap layer 10 with such methods used, the inclusion of pinhole and the like in the gap layer can be suppressed, so that the leakage of magnetic flux through the medium of the write gap layer 10 can be avoided. Such an effect is useful especially in the case where the thickness of the write gap layer 10 is made thin.

Furthermore, in the embodiment, the insulating film 15 is formed with sputtering and polishing process used. However, the invention is not always limited to the above. For example, the insulating film 15 may be formed with the CVD (Chemical Vapor Deposition) method and polishing process used. By using the CVD method, alumina can be filled with in the spacing between each winding and the other of the thin film coil 14 with no gap.

Figure 14:
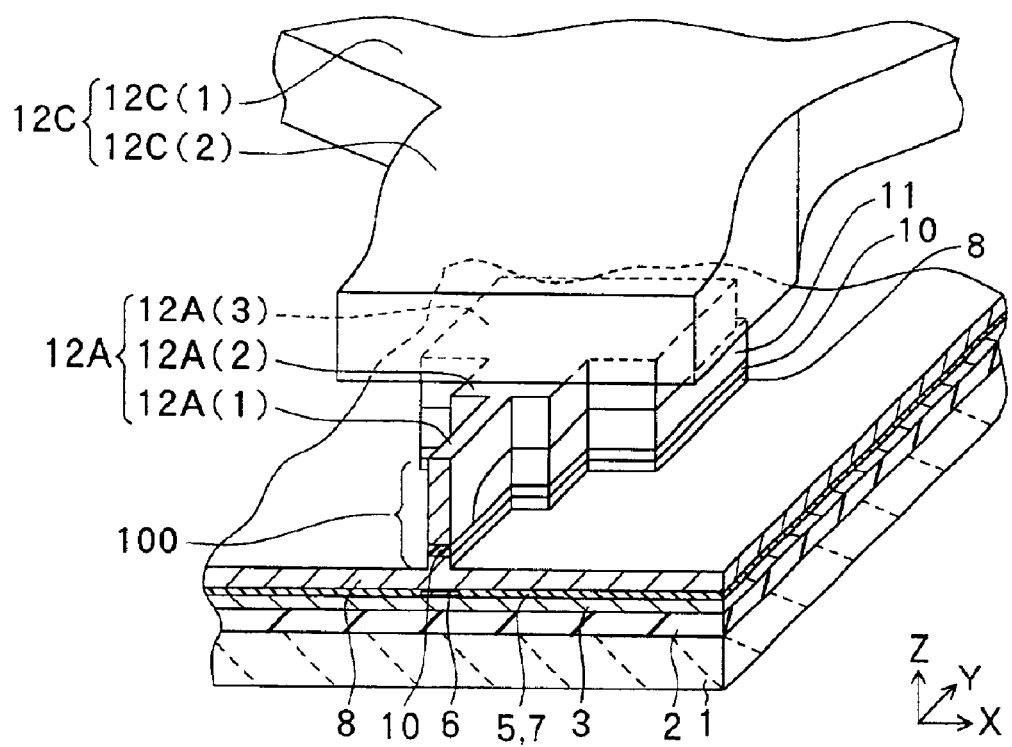
FIG. 14 is a perspective view showing another modification with regard to the structure of the thin film magnetic head according to the first embodiment of the invention.

Furthermore, in the embodiment, as shown in FIG. 9, the position of the front end of the insulating film pattern 11 is made to coincide with the coupling position I1 of the front end part 12A(1) and the intermediate part 12A(2) in the top pole tip 12A. However, the invention is not always limited to the above, but the position of the front end of the insulating film pattern 11 can be freely set. For example, as shown in FIG. 14, the disposing region of the insulating film pattern 11 may be expanded forward so as to position the front end thereof in the extending region of the front end part 12A(1). By changing the position (TH0 position) of the front end of the insulating film pattern 11, the throat height (TH) can be adjusted.

Furthermore, in the embodiment, the coil connection portion 14S is disposed at the inner terminating end of the thin film coil 14, and the coil connection portion 16S is disposed at the inner terminating end of the thin film coil 16. However, the invention is not always limited to the above. For example, the coil connection portions (14S and 16S) may be disposed at the outer terminating end of the respective thin film coils (14 and 16). In such a case as well, almost the same effect as the case of the above embodiment can be obtained.

Second Embodiment

Next, a second embodiment of the invention will be described.

Figures 19A, 19B:
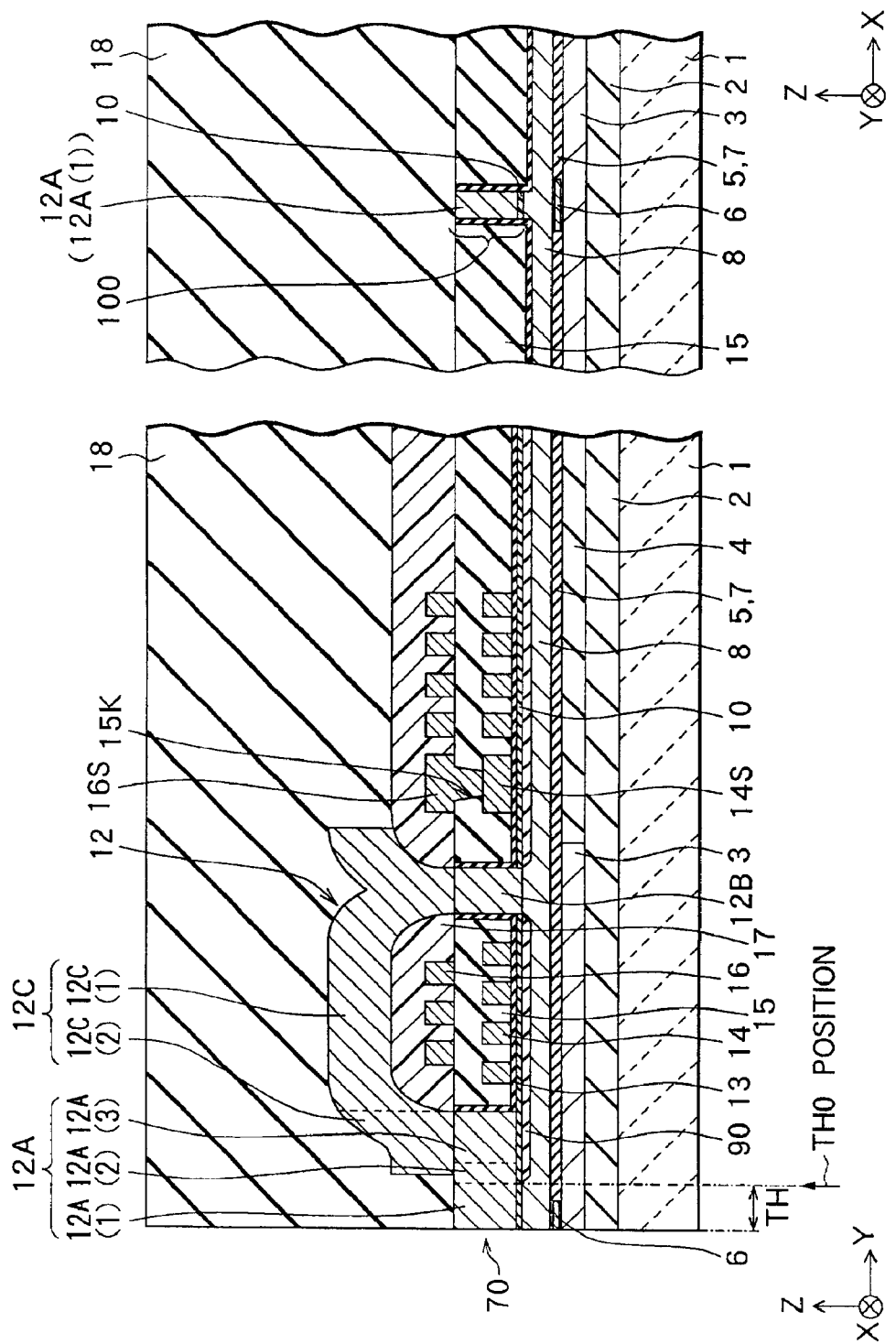
FIGS. 19A and 19B are cross sections for explaining a process subsequent to FIGS. 18A and 18B, respectively.
Figure 20:
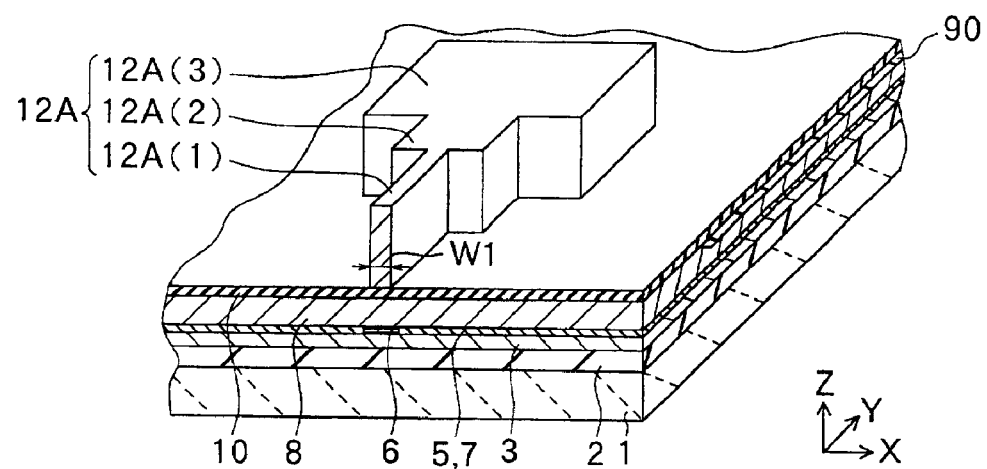
FIG. 20 is a perspective view corresponding to the cross sections shown in FIGS. 17A and 17B.
Figure 21:
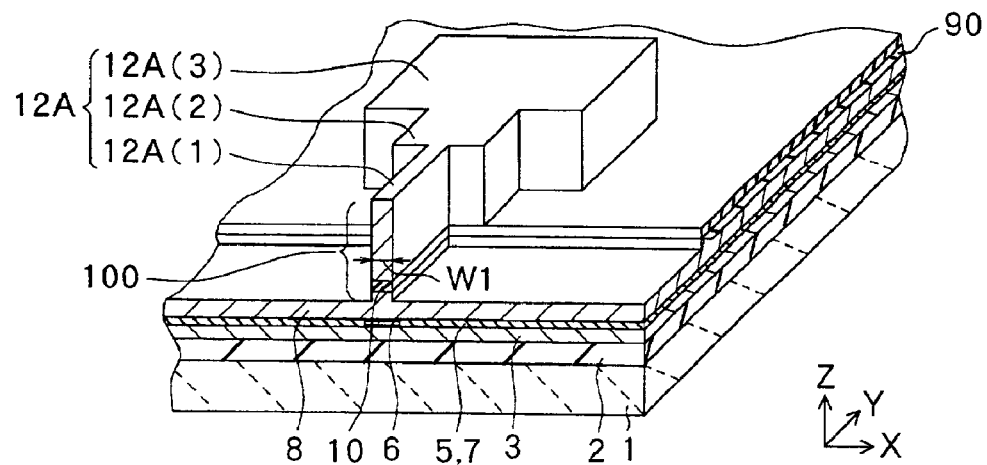
FIG. 21 is a perspective view corresponding to the cross sections shown in FIGS. 18A and 18B.
Figure 22:
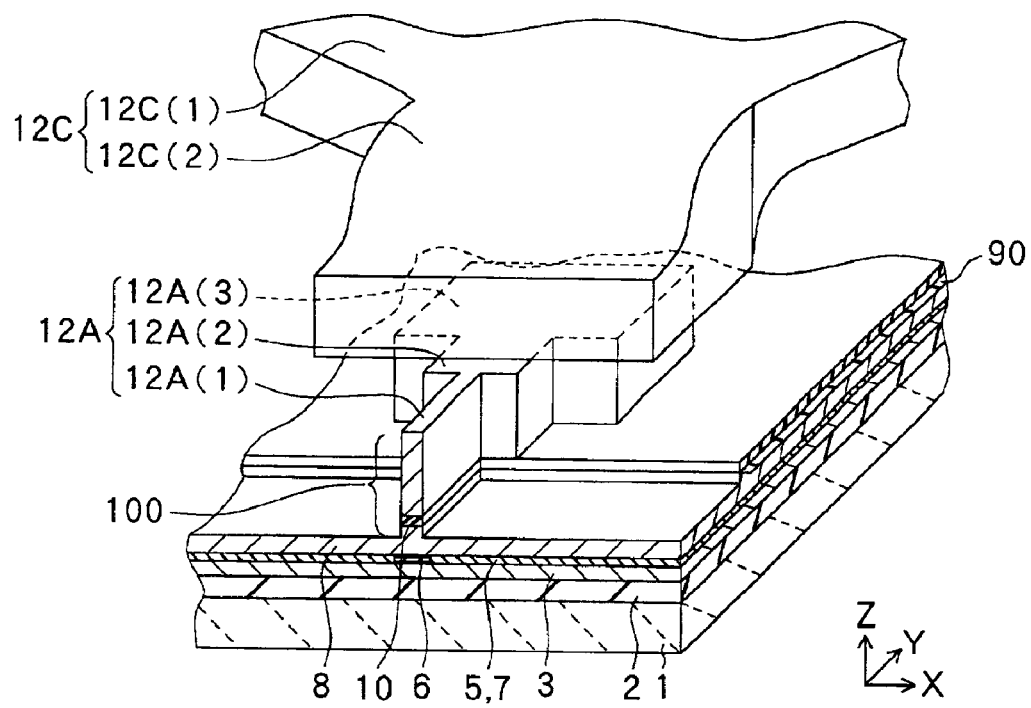
FIG. 22 is a perspective view corresponding to the cross sections shown in FIGS. 19A and 19B.

First of all, referring to FIGS. 15A and 15B to FIGS. 19A and 19B, and FIGS. 20 to 22, a method of manufacturing a composite thin film magnetic head as a method of manufacturing a thin film magnetic head according to a second embodiment of the invention will be described. In FIGS. 15A and 15B to FIGS. 19A and 19B, FIGS. 15A to 19A show cross sections each of which is perpendicular to the air bearing surface and FIGS. 15B to 19B show cross sections each of which is parallel to the air bearing surface of the pole portion. FIGS. 20 to 22 are perspective views corresponding to main manufacturing processes. Here, FIG. 20 corresponds to a state shown in FIGS. 17A and 17B. FIG. 21 corresponds to a state shown in FIGS. 18A and 18B. FIG. 22 corresponds to a state shown in FIGS. 19A and 19B. However, in FIG. 22, insulating films 13, 15 and 17, thin film coils 14 and 16, an overcoat layer 18 and the like in FIGS. 19A and 19B are omitted. Incidentally, in FIGS. 15A and 15B to FIGS. 19A and 19B, and FIGS. 20 to 22, each mark with respect to the X, Y and Z axes directions in each drawing denotes as in the case of the above first embodiment. Furthermore, in each drawing, the same components as those in the above first embodiment are designated by the same reference numerals, and the descriptions as to the forming material, the forming method, the structural characteristics and the like thereof are omitted as appropriate.

Figures 15A, 15B:
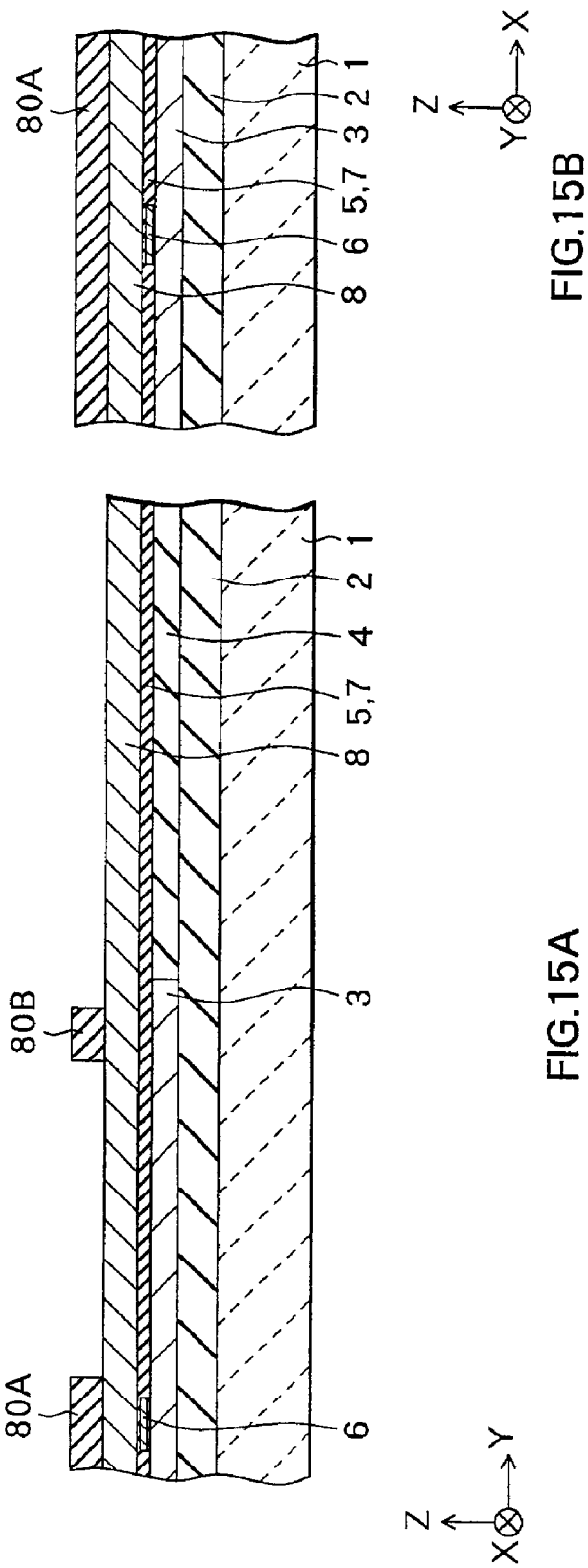
FIGS. 15A and 15B are cross sections for explaining a process in a method of manufacturing a thin film magnetic head according to a second embodiment of the invention.

In the method of manufacturing the thin film magnetic head according to the embodiment, the processes until the bottom pole 8 is formed in FIGS. 15A and 15B are similar to those shown in FIGS. 1A and 1B in the above first embodiment.

In the embodiment, after forming the bottom pole 8, as shown in FIGS. 15A and 15B, masks 80A and 80B made of an inorganic material such as alumina are selectively formed in a predetermined position on the bottom pole 8. At the time of forming the masks 80A and 80B, the respective forming regions are made to occupy regions other than a forming region of an insulating film pattern 90 (refer to FIGS. 17A and 17B and FIG. 23) which will be described hereinlater. In this connection, as the forming material of the masks 80A and 80B, in addition to the above-described alumina, aluminum nitride or the like may be used.

Subsequently, with the masks 80A and 80B used, an etching process is conducted on the entire surface by, for example, ion milling. Through the etching process, the bottom pole 8 is selectively dug down in a region other than the disposing region of the masks 80A and 80B, and thereby a recess region 8M is formed as shown in FIG. 16A. At the time of forming the recess region 8M, for example, the depth thereof is set to be about 0.5 $\mu$m to 0.8 $\mu$m.

Here, the formation of the masks 80A and 80B is, for example, performed according to the procedural steps as follow. That is, to begin with, an alumina layer is formed so as to cover the surface of the bottom pole 8 by sputtering or the like. Subsequently, on the alumina layer, masks made of Permalloy (Ni: 80 percent by weight and Fe: 20 percent by weight) or the like are formed by, for example, the frame plating method. The plane shapes of the masks that are formed at this time are made to be almost the same as the plane shapes of the masks 80A and 80B that will be formed eventually. Subsequently, by using the masks made of Permalloy, the alumina layer is etched by the RIE and the like, so that the masks 80A and 80B are formed.

Then, as shown in FIGS. 16A and 16B, a precursory insulating layer 90P made of alumina or the like is formed in a thickness of about 4.0 $\mu$m so as to cover the recess region 8M and the peripheral region thereof.

Then, the entire surface of the precursory insulating layer 90P is polished by the CMP method or the like so as to be planarized. By this polishing process, the insulating film pattern 90 with which the recess region 8M is filled is formed as shown in FIG. 17A. The polishing process for forming the insulating film pattern 90 is performed until the bottom pole 8 becomes exposed. The position of the front end of the insulating film pattern 90 is the position as a reference for determining the throat height (TH), that is, the throat height zero position (TH0 position).

Then, as shown in FIGS. 17A and 17B, the write gap layer 10 having the opening 10K is formed in a thickness of about 0.1 $\mu$m to 0.15 $\mu$m on the bottom pole 8.

Then, as shown in FIGS. 17A and 17B and FIG. 20, the top pole tip 12A is selectively formed in a thickness of about 1.5 $\mu$m to 2.5 $\mu$m on a front region of the write gap layer 10. At this time, for example, while making the top pole tip 12A extend from a region over the bottom pole 8 toward a region over the insulating film pattern 90, the coupling position I1 of the front end part 12A(1) and the intermediate part 12A(2) is made to coincide with the position of the front end of the insulating film pattern 90. At the time of forming the top pole tip 12A, simultaneously, the magnetic path connection portion 12B is selectively formed on the exposed surface of the bottom pole 8 in the opening 10K.

Then, for example, a photoresist film (not shown) is selectively formed so as to cover a region rearward of the coupling position I1 of the front end part 12A(1) and the intermediate part 12A(2) in the top pole tip 12A. By the existence of the photoresist film, in contrast to the case of the above first embodiment, it can be prevented that a region rearward of the top pole tip 12A on the write gap layer 10 is etched at the time of the etching process in a following process. Then, with the photoresist film and the top pole tip 12A as masks, the etching process is conducted on the entire surface by the RIE. At the time of performing the etching process, for example, in a manner similar to the case where the write gap layer 10 and the bottom pole 8 are etched in the above first embodiment, the etching conditions (the gas type of the etching gas, the supplied amount of the etching gas, the processing temperature and the like) are adjusted. By the etching process, as shown in FIGS. 18A and 18B and FIG. 21, the write gap layer 10 and part of the bottom pole 8 to a predetermined depth are selectively removed in a region forward of the coupling position I1 of the front end part 12A(1) and the intermediate part 12A(2) in the top pole tip 12A, and thereby the pole portion 100 having a trim structure is formed so as to have the extremely minute uniform width W1.

In passing, after forming the pole portion 100, a process of forming the insulating film 13 and the later processes are similar to those in the case of the above first embodiment. The structure of the thin film magnetic head which will be finally formed is as shown in FIGS. 19A and 19B and FIG. 22.

Figure 23:
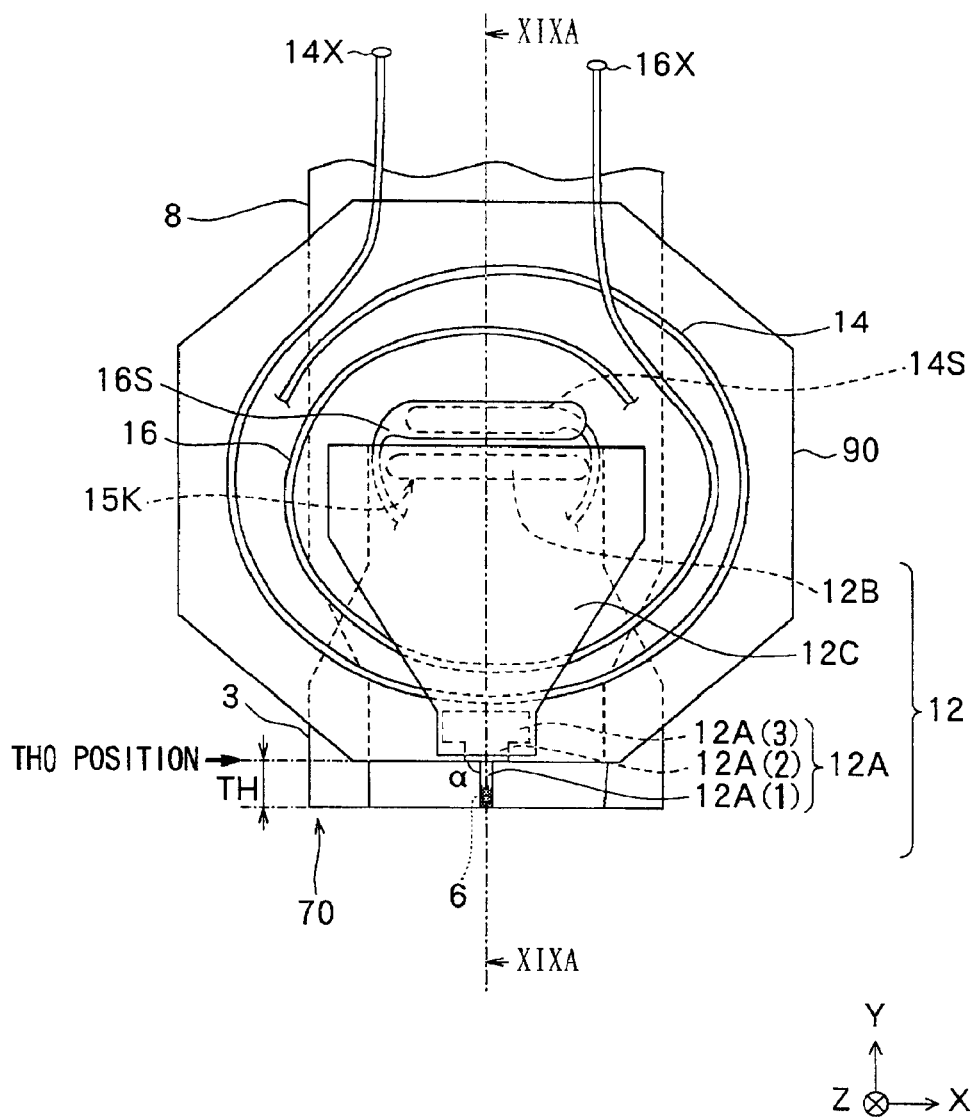
FIG. 23 is a plan view showing the plane structure of the thin film magnetic head according to the second embodiment of the invention.

FIG. 23 shows a rough outline of the plane structure of the thin film magnetic head manufactured by the method of manufacturing the thin film magnetic head according to the embodiment. In FIG. 23, the same components as those shown in FIG. 10 of the above first embodiment are designated by the same reference numerals. FIG. 19A corresponds to a cross section taken along line XIXA—XIXA in FIG. 23. In this connection, each mark with respect to the X, Y and Z axes directions in FIG. 23 denotes as in the case of FIGS. 15A and 15B to FIGS. 19A and 19B, and FIGS. 20 to 22.

The insulating film pattern 90 extends widely so as to include the disposing regions of the thin film coils 14 and 16. The throat height (TH) is specified as a length from the position (TH0 position) of the front end of the insulating film pattern 90 to the air bearing surface 70.

Incidentally, the structural characteristics with respect to the structures other than the above described that are shown in FIG. 23 are similar to those in the case of the above first embodiment (refer to FIG. 10).

In the embodiment, the top pole tip 12A is formed on the planarized surface after polishing by the CMP, so that the top pole tip 12A can be formed with high precision for the reason as follows. That is, for example, in the case where the top pole tip 12A is formed on the underlayer having an uneven structure by using the frame plating method, the reflection light reflected from the surface of the underlayer in the horizontal direction or in the diagonal direction is generated in the exposing process on the photoresist film for forming a frame pattern, so that the exposure region of the photoresist film becomes larger or smaller under the influence of the reflection light. As a result, it is difficult to form the frame pattern with high precision. Contrarily, in the embodiment, since the top pole tip 12A is formed on the planarized surface, the undesirable influence of the reflection light at the time of exposure is suppressed.

Consequently, the top pole tip 12A can be formed with high precision, in particular, so that the front end part 12A(1) has the extremely minute uniform width W1.

Furthermore, in the embodiment, the top pole tip 12A and the magnetic path connection portion 12B are formed by using the frame plating method. However, the invention is not always limited to the above. For example, as shown in FIGS. 24A, 24B, 25A and 25B, the sputtering and the etching process may be used as in the case where the bottom pole 8 is formed. In this case, to begin with, as shown in FIGS. 24A and 24B, after forming the write gap layer 10 (refer to FIGS. 1A and 1B), a precursory magnetic layer 112A made of iron nitride or the like is selectively formed in a thickness of about 1.5 $\mu$m to 2.5 $\mu$m by the sputtering so as to cover the entire surface. Then, on the precursory magnetic layer 112A, for example, masks 81A and 81B are selectively formed by using the forming material and the forming method almost the same as those in the case where the masks 80A and 80B are formed in the above embodiment. The plane shapes of the masks 81A and 81B are made to be plane shapes corresponding to the plane shapes of the top pole tip 12A and the magnetic path connection portion 12B, respectively. Then, with the masks 81A and 81B used, the precursory magnetic layer 112A is etched and patterned by the RIE or the like, so that the top pole tip 12A and the magnetic path connection portion 12B are selectively formed as shown in FIGS. 25A and 25B. At the time of etching the precursory magnetic layer 112A by the RIE, for example, as in the case where the bottom pole 8 is etched in the above embodiment, the etching gas including chlorine and the like is used, and the processing temperature is set to be within the range of 30° C. to 300° C. (more preferably, 150° C. to 250° C.). As a result of this, the top pole tip 12A and the magnetic path connection portion 12B can be formed with high precision and in a short time. Incidentally, at the time of having completed the etching process, the masks 81A and 81B may be set to remain (refer to FIGS. 25A and 25B), or not to remain. Even if the masks 81A and 81B remain, these masks will be polished and removed in the polishing process for forming the insulating film 15 (refer to FIGS. 3A, 3B, 4A and 4B).

Furthermore, since the processes, action, effects, modification and the like other than the above described with respect to the method of manufacturing the thin film magnetic head according to the embodiment are similar to those in the case of the above first embodiment, their description is omitted.

Although the invention has been described above by giving some embodiments, the invention is not limited to the embodiments but can be variously modified.

For example, although the method of manufacturing the composite thin film magnetic head has been described in each of the above-described embodiments and their modifications, the invention can be also applied to a recording-only thin film magnetic head having an inductive magnetic transducer for writing and a thin film magnetic head having an inductive magnetic transducer for recording and reproducing. Additionally, the invention can be also applied to a thin film magnetic head of the structure in which an element for writing and an element for reading are laminated in the opposite order.

Furthermore, the plane shape of each of the magnetic layer portions (top pole tip, top yoke, and the like) which constitute the top pole shown in each of the above embodiments is not always limited to that shown in FIG. 10 and the like, but can be freely changed as far as the magnetic volume of each of the magnetic layer portions can be made appropriate so that the magnetic flux generated by the thin film coils can be sufficiently supplied to the front end portion of the front end part.

Furthermore, although the structure of the thin film magnetic head having the structure of two-layer coils is described in each of the above embodiments, the number of layers of the thin film coils can be freely changed. In particular, by increasing the number of layers of the thin film coils, the generated amount of the magnetic flux can be increased.

As described above, according to the method of manufacturing the thin film magnetic head of the invention, the gap layer in the region other than the portion corresponding to the uniform width portion is selectively removed and the first magnetic layer in the region other than the portion corresponding to the uniform width portion is selectively removed to the predetermined depth by the reactive ion etching with the uniform width portion as a mask in an atmosphere of gas including at least chlorine out of a group of chlorine and boron trichloride and at an ambient temperature within the range of 30° C. to 300° C. Consequently, the respective parts of the gap layer and the first magnetic layer are formed so as to have the same width as the width of the uniform width portion with higher precision and in a shorter time than the case where the ion milling is used as an etching method, so that the yield in manufacturing the thin film magnetic head can be improved.

Particularly, according to the method of manufacturing the thin film magnetic head of one aspect of the invention, in the fourth step, the selective removal of the gap layer is performed in an atmosphere of gas including chlorine and boron trichloride and the selective removal of the first magnetic layer is performed in an atmosphere of gas including chlorine. Consequently, the etching process is performed in an atmosphere of etching gas that is appropriate for the material properties of each of the gap layer and the first magnetic layer, so that the etching can be performed in a shorter time.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin film magnetic head comprising:

a first magnetic layer and a second magnetic layer magnetically coupled to each other and having two magnetic poles facing each other with a gap layer in between near and in a recording-medium-facing surface to be faced with a recording medium;

a thin film coil provided between the first and second magnetic layers; and an insulating layer for insulating the thin film coil from the first and the second magnetic layers, the second magnetic layer including a uniform width portion which defines a recording track width of the recording medium;

wherein the method comprises:

a first step of forming the first magnetic layer on a substrate through sputtering by using a magnetic material including iron nitride;

a second step of forming the gap layer on the first magnetic layer;

a third step of selectively forming at least the uniform width portion in the second magnetic layer on the gap layer by using a predetermined magnetic material, the uniform width portion extending so as to cross over a position in which the recording-medium-facing surface is to be formed; and a fourth step of selectively removing the gap layer in a region other than a portion corresponding to the uniform width portion, through relactive ion etching with the uniform width portion as a mask, in an atmosphere of gas including chlorine and boron trichloride, and at an ambient temperature within a range of 30° C. to 300° C. and selectively removing the first magnetic layer in a region other than a portion corresponding to the uniform width portion to a predetermined depth, through reactive ion etching with the uniform width portion as the mask, in an atmosphere of gas including chlorine, and at an ambient temperature within a range of 30° to 300° C.

2. A method of manufacturing a thin film magnetic head according to claim 1, wherein the uniform width portion is formed through a plating process by using the predetermined magnetic material including iron, nickel and cobalt in the third step.

3. A method of manufacturing a thin film magnetic head according to claim 1, wherein the uniform width portion is formed through sputtering and an etching process by using the predetermined magnetic material including either a cobalt iron alloy or a cobalt iron alloy oxide as an amorphous alloy in the third step.

4. A method of manufacturing a thin film magnetic head according to claim 1, wherein the fourth step is performed at the ambient temperature within a range of 150° C. to 250° C.

5. A method of manufacturing a thin film magnetic head according to claim 1, wherein the gap layer is selectively removed in the gas atmosphere built by setting an amount of the chlorine gas to be supplied within a range of 20 to 40 milliliters per minute and setting an amount of the boron trichloride gas to be supplied within a range of 60 to 80 milliliters per minute, and the first magnetic layer is selectively removed in a gas atmosphere build by setting an amount of the chlorine gas to be supplied within a range of 100 to 200 milliliters per minute.

* * * * *